US011676203B2

(12) United States Patent
Diana

(10) Patent No.: US 11,676,203 B2
(45) Date of Patent: Jun. 13, 2023

(54) SYSTEM FOR DYNAMICALLY ADJUSTING A PRE-APPROVAL LETTER

(71) Applicant: Avenu Technologies, Inc., Salt Lake City, UT (US)

(72) Inventor: Marc L. Diana, Cornelius, NC (US)

(73) Assignee: AVENU TECHNOLOGIES, INC., Salt Lake City, UT (US)

( * ) Notice: Subject to any disclaimer, the term of this patent is extended or adjusted under 35 U.S.C. 154(b) by 71 days.

(21) Appl. No.: 17/162,095

(22) Filed: Jan. 29, 2021

(65) Prior Publication Data

US 2021/0241371 A1 Aug. 5, 2021

Related U.S. Application Data

(60) Provisional application No. 62/968,693, filed on Jan. 31, 2020.

(51) Int. Cl.
*G06Q 40/03* (2023.01)
*G06F 40/166* (2020.01)
(Continued)

(52) U.S. Cl.
CPC .......... *G06Q 40/03* (2023.01); *G06F 40/166* (2020.01); *G06F 40/131* (2020.01); *G06Q 50/16* (2013.01)

(58) Field of Classification Search
None
See application file for complete search history.

(56) References Cited

U.S. PATENT DOCUMENTS 8,473,389 B2 6/2013 Wade
8,671,052 B1 3/2014 Palumbo et al.
(Continued)

FOREIGN PATENT DOCUMENTS

KR 20190112930 A 10/2019

OTHER PUBLICATIONS

Better mortgage is giving their borrowers an edge in competitive housing markets: Their new verified pre-approval letter is a "r-e-v-o-l-u-t-i-o-n". (Apr. 26, 2017). PR Newswire Retrieved from https://dialog.proquest.com/professional/docview/1891988045?accountid=131444 on Jun. 2, 2022 (Year: 2017).*
(Continued)

*Primary Examiner* — Kito R Robinson
(74) *Attorney, Agent, or Firm* — Baker Botts L.L.P.

(57) ABSTRACT

According to certain embodiments, a user device comprises a communication interface, an input/output (I/O) interface, and processing circuitry. The processing circuitry is configured to obtain a maximum pre-approval amount, generate a graphical user interface comprising an adjustable pre-approval field that enables a user to select up to the maximum pre-approval amount to include in a pre-approval letter, display the graphical user interface via the I/O interface, and receive an input associated with the adjustable pre-approval field via the I/O interface. The input indicates an adjusted pre-approval amount selected by the user. The processing circuitry is further configured to facilitate generating the pre-approval letter indicating that a customer has been pre-approved for the adjusted pre-approval amount, the pre-approval letter including a pre-authorized signature of a lender and generated without sending the lender the adjusted pre-approval amount.

19 Claims, 17 Drawing Sheets

(51) Int. Cl.
    *G06F 40/131*        (2020.01)
    *G06Q 50/16*         (2012.01)

(56)                References Cited

U.S. PATENT DOCUMENTS

2004/0133493  A1*   7/2004  Ford ................... G06Q 30/06
                                                          705/35
2005/0289046  A1*  12/2005  Conyack, Jr. ......... G06Q 40/02
                                                          705/38
2009/0292655  A1   11/2009  Geller et al.
2010/0274698  A1*  10/2010  Bhattiprolu ............ G06Q 40/00
                                                          705/35
2013/0179301  A1    7/2013  Joffrey
2015/0039490  A1*   2/2015  Forrester ............. G06Q 40/025
                                                          705/38
2017/0076408  A1*   3/2017  D'Souza ............... G06Q 20/10

OTHER PUBLICATIONS

Di Martino, D. (Nov. 10, 2003). For dallas-area home buyers, extra homework pays off. Knight Ridder Tribune Business News Retrieved from https://dialog.proquest.com/professional/docview/461714510?accountid=131444 on Oct. 26, 2022 (Year: 2003).*

PCT Notification of Transmittal of the International Search Report and the Written Opinion of the International Searching Authority, or the Declaration; International Application No. PCT/US2021/015718; 9 pages; dated May 21, 2021.

* cited by examiner

Invite User

First Name _____ Last Name _____

User-email _____ Phone Number _____

Organization _____ Role _____

( Send invitation )

Agent 125

FIGURE 10

Mortgage Application

Your application is in progress
Add or edit your information before submitting your application

Assets
$755,000

☐ Your Financial Accounts
　　Wells Fargo Bank　　　　　　　$10,000

☐ Co-Borrower's Financial Accounts　　N/A

☐ Your Real Estate
　　47 Windchime　　　　　　　　$745,000

☐ Co-Borrower's Real Estate　　　　N/A

SYSTEM FOR DYNAMICALLY ADJUSTING A PRE-APPROVAL LETTER

RELATED APPLICATIONS

This application claims benefit under 35 U.S.C. § 119(e) to U.S. Provisional Application Ser. No. 62/968,693, entitled "System for Dynamically Adjusting a Pre-Approval Letter," filed Jan. 31, 2020, the entire content of which is incorporated herein by reference.

TECHNICAL FIELD

This disclosure generally relates to a system for dynamically adjusting a pre-approval letter.

BACKGROUND

The loan process often takes several steps to complete. Typically, a potential borrower initiates the loan process by submitting a loan application to a lender. The lender may then review the loan application to determine whether to pre-approve the potential borrower for a loan of a certain value. During the pre-approval stage, the lender may evaluate a potential borrower's creditworthiness based on factors such as the borrower's income and credit history. The lender may obtain this information from documents submitted with the loan application, public records, etc. The lender may then issue a pre-approval letter. The pre-approval letter indicates that the lender is generally willing to extend a loan to the potential borrower up to a certain amount. Although the pre-approval letter is not a guaranteed offer of a loan, the pre-approval letter can help the potential borrower to make a purchase. As an example, the potential borrower may be a home buyer. The potential borrower may provide a seller with the pre-approval letter when making an offer to purchase a home. The pre-approval letter may give the potential borrower an advantage over other buyers making offers on the same home. For example, the pre-approval letter gives the seller confidence that the potential borrower can likely get a loan in an amount sufficient to purchase the home. Once the seller accepts the offer, the potential borrower may proceed with the next steps of the loan process to obtain a loan (e.g., a mortgage) that enables the potential borrower to complete the purchase.

SUMMARY

Conventional processes for obtaining a pre-approval letter from a lender tend to be time consuming and inflexible. For example, if a potential borrower wishes to make a change to a pre-approval letter, conventional processes would require some back-and-forth with the lender to do so. This back-and-forth can introduce delay and frustrate the potential borrower. Certain embodiments of the present disclosure may provide solutions to these problems.

According to certain embodiments, a user may dynamically change a loan amount indicated in a pre-approval letter. As an example, suppose that a lender has issued a pre-approval letter with a loan amount of $1,000,000. Further suppose that the buyer plans to offer a seller $700,000 to purchase a house. The buyer may be reluctant to provide the pre-approval letter to the seller because the loan amount indicated in the pre-approval letter may suggest to the seller that the buyer can afford to spend more than the offered amount. Thus, the buyer may be concerned that providing the pre-approval letter to the seller will cause the seller to increase the asking price for the house. To avoid this problem, certain embodiments of the present disclosure enable the user to dynamically decrease the pre-approval amount and to generate a new pre-approval letter in the lower amount. Continuing with the example, the user may decide to dynamically change the loan amount from $1,000,000 to $750,000, generate a new pre-approval letter in the amount of $750,000, and provide the new pre-approval letter with the $700,000 offer on the house.

According to certain embodiments, a user device comprises a communication interface, an input/output (I/O) interface, and processing circuitry. The processing circuitry is configured to obtain a maximum pre-approval amount available to a customer, the maximum pre-approval amount based on a pre-approval policy that has been pre-authorized by a lender. The processing circuitry is further configured to generate a graphical user interface comprising an adjustable pre-approval field that enables a user to select up to the maximum pre-approval amount to include in a pre-approval letter, display the graphical user interface via the I/O interface, and receive an input associated with the adjustable pre-approval field via the I/O interface. The input indicates an adjusted pre-approval amount selected by the user. The processing circuitry is further configured to facilitate generating the pre-approval letter indicating that a customer has been pre-approved for the adjusted pre-approval amount, the pre-approval letter including a pre-authorized signature of the lender and generated without sending the adjusted pre-approval amount to the lender.

According to certain embodiments, a non-transitory computer readable medium comprises logic that, when executed by processing circuitry of a user device, causes the user device to perform actions comprising: obtaining a maximum pre-approval amount available to a customer, generating a graphical user interface comprising an adjustable pre-approval field that enables a user to select up to the maximum pre-approval amount to include in a pre-approval letter, displaying the graphical user interface via the I/O interface, and receiving an input associated with the adjustable pre-approval field via the I/O interface. The input indicates an adjusted pre-approval amount selected by the user. The actions further comprises facilitating generation of the pre-approval letter indicating that the customer has been pre-approved for the adjusted pre-approval amount, the pre-approval letter including a pre-authorized signature of a lender and generated without sending the adjusted pre-approval amount to the lender.

According to certain embodiments, a method comprises obtaining a maximum pre-approval amount available to a customer, generating a graphical user interface comprising an adjustable pre-approval field that enables a user to select up to the maximum pre-approval amount to include in a pre-approval letter, displaying the graphical user interface via the I/O interface, and receiving an input associated with the adjustable pre-approval field via the I/O interface. The input indicates an adjusted pre-approval amount selected by the user. The method further comprises facilitating generation of the pre-approval letter indicating that the customer has been pre-approved for the adjusted pre-approval amount, the pre-approval letter including a pre-authorized signature of a lender and generated without sending the adjusted pre-approval amount to the lender.

According to certain embodiments, a lending system comprises a communication interface and processing circuitry. The processing circuitry is configured to obtain a pre-authorization of a lender to include a signature of the lender on pre-approval letters that comply with a pre-approval policy. The processing circuitry is further configured to receive customer information via the communication interface. The customer information is associated with a customer seeking pre-approval of a loan. The processing circuitry is further configured to apply the pre-approval policy to the customer information to yield a pre-approval result. Applying the pre-approval policy occurs sometime after obtaining the pre-authorization of the lender. The processing circuitry is further configured to determine, based on the pre-approval result, a maximum pre-approval amount available to the customer. The processing circuitry is further configured to facilitate generating one or more of the pre-approval letters. Each pre-approval letter indicates that the customer has been pre-approved for an adjusted pre-approval amount. The adjusted pre-approval amount is less than or equal to the maximum pre-approval amount. Each pre-approval letter includes a signature of the lender based on the pre-authorization of the lender, without obtaining further authorization from the lender.

According to certain embodiments, a non-transitory computer readable medium comprises logic that, when executed by processing circuitry of a lending system, causes the lending system to perform actions comprising: obtaining a pre-authorization of a lender to include a signature of the lender on pre-approval letters that comply with a pre-approval policy, receiving customer information associated with a customer seeking pre-approval of a loan, and applying the pre-approval policy to the customer information to yield a pre-approval result. Applying the pre-approval policy occurs sometime after obtaining the pre-authorization of the lender. The actions further comprise determining, based on the pre-approval result, a maximum pre-approval amount available to the customer and facilitating generation of one or more of the pre-approval letters. Each pre-approval letter indicates that the customer has been pre-approved for an adjusted pre-approval amount. The adjusted pre-approval amount is less than or equal to the maximum pre-approval amount. Each pre-approval letter includes a signature of the lender based on the pre-authorization of the lender, without obtaining further authorization from the lender.

According to certain embodiments, a method comprises obtaining a pre-authorization of a lender to include a signature of the lender on pre-approval letters that comply with a pre-approval policy, receiving customer information associated with a customer seeking pre-approval of a loan, and applying the pre-approval policy to the customer information to yield a pre-approval result. Applying the pre-approval policy occurs sometime after obtaining the pre-authorization of the lender. The method further comprises determining, based on the pre-approval result, a maximum pre-approval amount available to the customer and facilitating generation of one or more of the pre-approval letters. Each pre-approval letter indicates that the customer has been pre-approved for an adjusted pre-approval amount. The adjusted pre-approval amount is less than or equal to the maximum pre-approval amount. Each pre-approval letter includes a signature of the lender based on the pre-authorization of the lender, without obtaining further authorization from the lender.

Certain embodiments may provide one or more technical advantages. Certain embodiments improve the speed and/or efficiency associated with issuing a pre-approval letter. For example, certain embodiments allow for dynamically changing a loan amount in a pre-approval letter. Increasing the speed may allow a customer to submit an offer backed by a pre-approval letter in time for the offer to be accepted (before the seller sells the property to someone else). Certain embodiments allow for dynamically generating pre-approval letters that maintain the gravitas of being signed by a lender, while reducing or eliminating the need for back-and-forth with the lender. Certain embodiments manage the use of a lender's signature in an electronic environment that applies security settings to ensure that the lender's signature is used in a manner authorized by the lender. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 10 illustrates an example of a graphical user interface for initiating an invitation for a customer to join a lending platform, in accordance with certain embodiments.

DETAILED DESCRIPTION

Figure 1:
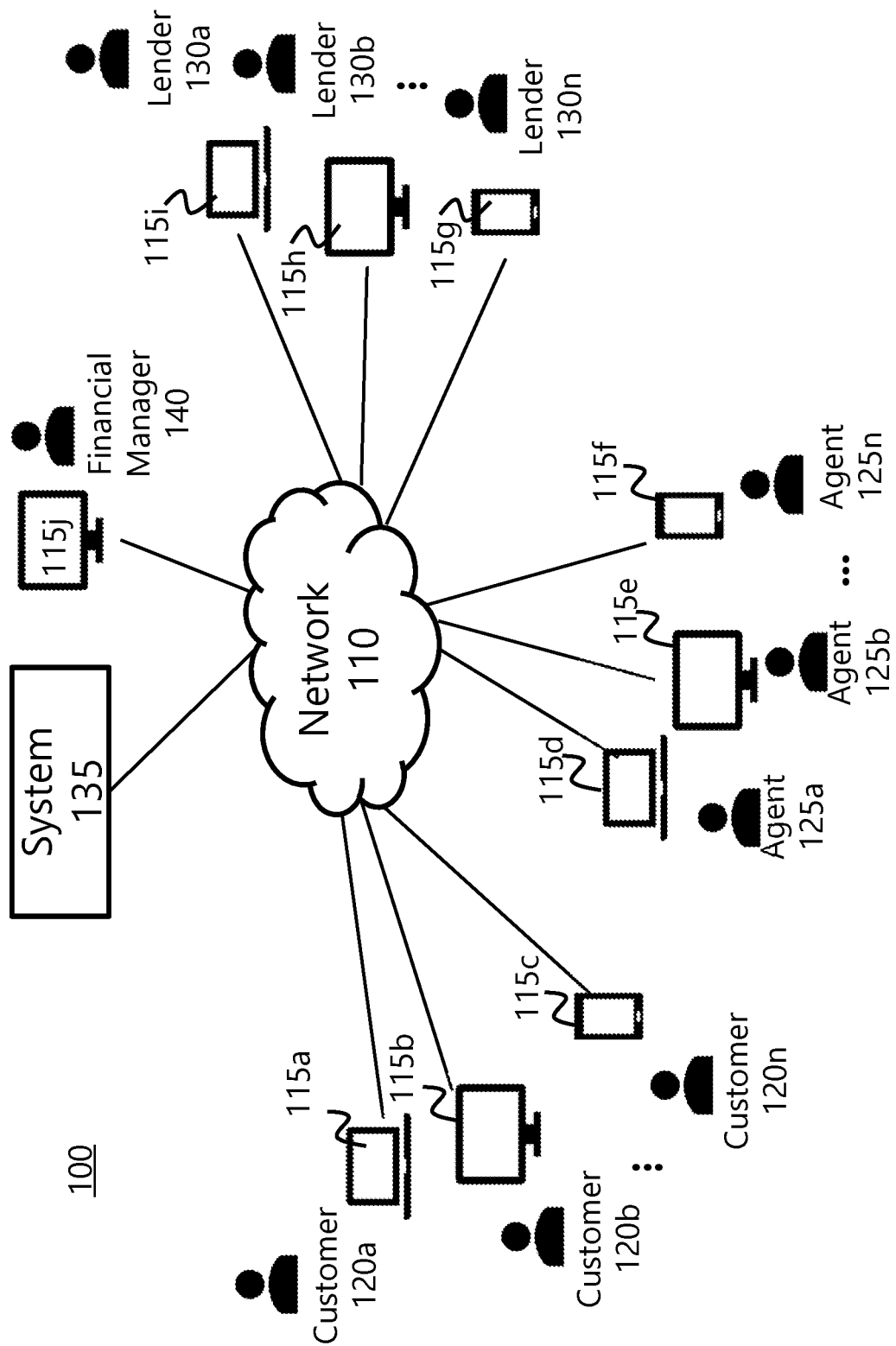
FIG. 1 is block diagram illustrating a system that may be used to dynamically generate a pre-approval letter, in accordance with certain embodiments.

FIG. 1 is block diagram illustrating a system 100 that may be used to perform one or more of the methods described herein, in accordance with certain embodiments. FIG. 1 illustrates a network 110 connecting a plurality of user devices 115a-115j. Each user device 115 enables a respective user to access functionality of system 100. Examples of users may include one or more customers 120, one or more agents 125, one or more lenders 130, and one or more financial managers 140. As further described below, system 100 further comprises one or more lending systems 135 configured to facilitate interactions among customers 120, agents 125, lenders 130, and/or financial managers 140. Certain embodiments allow customers 120, agents 125, lenders 130, and/or financial managers 140 to interact via lending system 135 in order to dynamically generate pre-approval letters.

In general, customers 120, agents 125, lenders 130, and/or financial managers 140 interact with user devices 115 to communicate information via network 110. In certain embodiments, a customer 120 requests pre-approval of a loan from lending system 135. Lending system 135 applies a policy to determine loan products for which customer 120 is qualified to receive pre-approval. Lending system 135 provides agent 125 with pre-approval information for customer 120. The pre-approval information indicates information about the loan products for which customer 120 is qualified to receive pre-approval. For example, the pre-approval information may indicate a maximum pre-approval amount for the loan. The pre-approval information may be used by agent 125 when providing a seller with an offer on behalf of customer 120. If the seller accepts the offer, certain embodiments facilitate a loan procedure between customer 120 and lender 130.

Network 110 may comprise any suitable network for facilitating communication among user devices 115 and lending system 135. In certain embodiments, network 110 may comprise a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, network 110 may comprise a wireless PAN (WPAN) (such as, for example, a BLU-ETOOTH WPAN), a WI-FI network, a WI-MAX network, a cellular telephone network (such as, for example, a Global System for Mobile Communications (GSM) network), or other suitable wireless network or a combination of two or more of these.

User device 115 enables a user to access functionality of system 100. Examples of a user device 115 include a smartphone, a mobile telephone, a personal digital assistant (PDA), a tablet computer, a laptop computer, a desktop computer, etc. In certain embodiments, user device 115 may be implemented using a computer system, such as computer system 600 described with respect to FIG. 6. User device 115 may allow a user to run an application that facilitates dynamically generating a pre-approval letter. FIGS. 2, 3, and 4a-4b provide examples of steps that may be performed by user devices 115 associated with a customer 120, an agent 125, a lender 130, and a financial manager 140. For simplicity, certain examples below have been described with respect to a customer 120, agent 125, lender 130, or financial manager 140 performing certain actions. Customer 120 may perform actions by interacting with customer 120's user device 115, agent 125 may perform actions by interacting with agent 125's user device 115, lender 130 may perform actions by interacting with lender 130's user device 115, and financial manager 140 may perform actions by interacting with financial manager 140's user device 115. Thus, user devices 115 may send and receive messages via network 110, receive input from and communicate output to a user (e.g., customer 120, agent 125, lender 130, or financial manager 140), and perform processing steps necessary to support the functionality of the various embodiments described herein.

Figure 12:
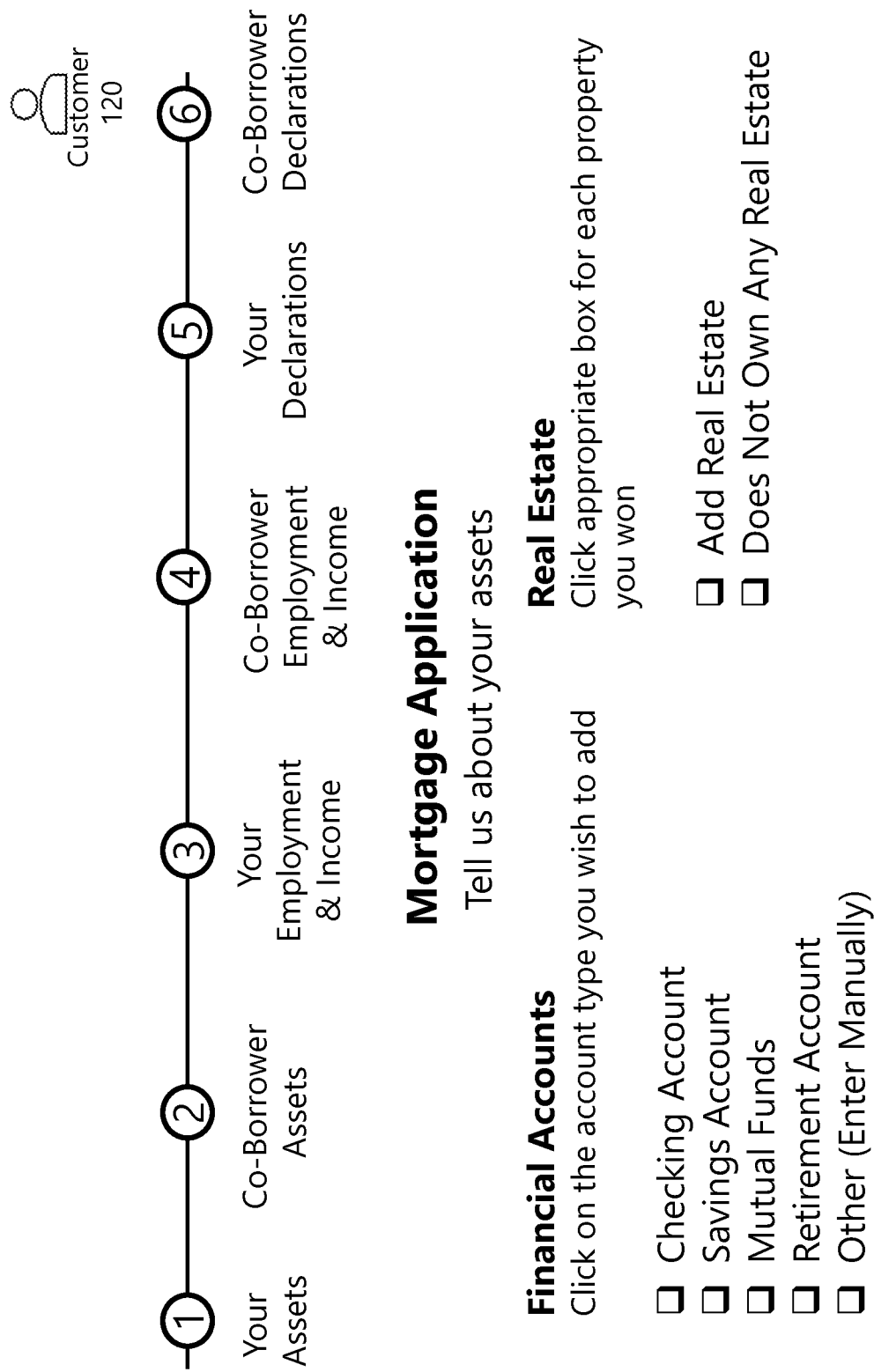
FIGS. 12-14 illustrate examples of graphical user interfaces that may be used to manage an application for a loan pre-approval and/or a loan, in accordance with certain embodiments.
Figure 13:
Figure 14:
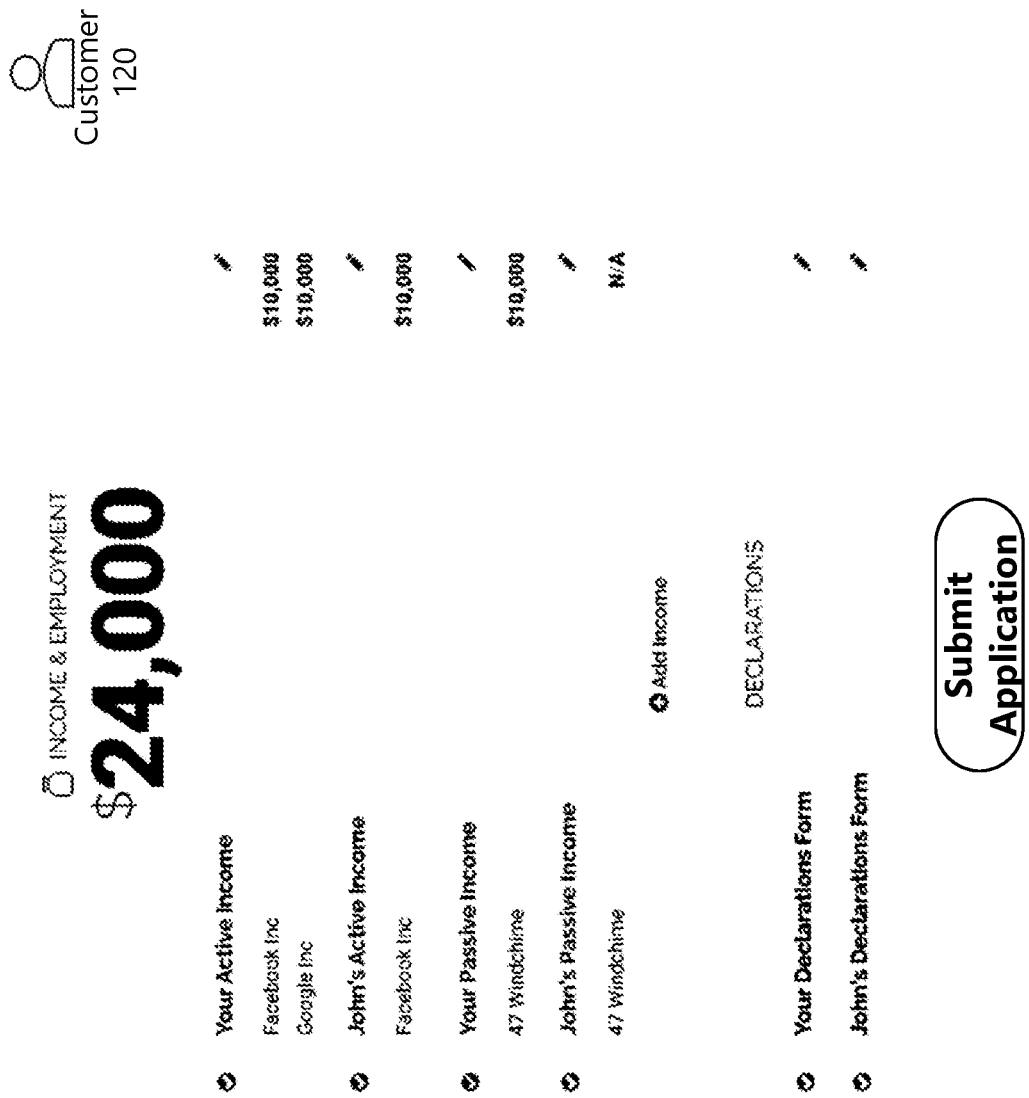

Customer 120 may interact with customer 120's user device 115 to communicate with an agent 125, lender 130, lending system 135, and/or financial manager 140. In certain embodiments, customer 120 may be a home buyer seeking a mortgage. In certain embodiments, customer 120 interacts with customer 120's user device 115 to initiate an application for loan pre-approval. For example, customer 120 may fill out an application form that includes identification information (e.g., name, social security number). The application form facilitates providing financial information (e.g., income, assets, debt, credit score) that can be used to determine one or more loan products for which customer 120 has been pre-approved. For example, the application form (or documents associated with the application form) may contain customer 120's financial information and/or the application form may initiate (or authorize) obtaining customer 120's financial information from third parties or public records. In certain embodiments, customer 120 interacts with customer 120's user device 115 to send the application for loan pre-approval to lending system 135. Lending system 135 may facilitate pre-approval of a loan. Additionally, lending system 135 may facilitate connecting customer 120 with lender 130 when customer 120 is ready to proceed with the loan process. FIGS. 12-14 illustrate examples of screen captures from a graphical user interface that may be provided via customer 120's user device 115 to manage an application for loan pre-approval and/or for a loan.

Agent 125 may interact with agent 125's user device 115 to communicate with customer 120, lender 130, lending system 135, and/or financial manager 140. As further described below, agent 125 may assist a customer 120 in purchasing property. For example, in certain embodiments, agent 125 is a realtor or real estate agent assisting customer 120 in the purchase of a house or other real property. To participate in system 100, agent 125 may be on-boarded through a sign-up process with a service provider associated with lending system 135. For example, agent 125 may download a software application, agree to terms, select preferred lenders from among lenders 130 that have been on-boarded with system 100, etc.

Lender 130 may interact with lender 130's user device 115 to communicate with customer 120, agent 125, lending system 135, and/or financial manager 140, in accordance with certain embodiments. For example, in certain embodiments, lender 130 may communicate with lending system 135 to establish or approve a pre-approval policy. The pre-approval policy comprises a set of objective rules for determining whether a customer 120 qualifies for one or more loan products. As an example, lender 130 may expressly approve a pre-approval policy. As another example, lender 130 may implicitly approve a pre-approval policy by registering to participate in the lending platform. After lender 130 approves the pre-approval policy, lender 130 may authorize lending system 135 to apply the pre-approval policy. In certain embodiments, lender 130 may receive pre-approval information associated with customer 120 from lending system 135. In response, lender 130 may opt to communicate with lending system 135 to submit a quote in order to bid on the opportunity to complete a loan with customer 120. Lending system 135 connects lender 130 with customer 120 if customer 120 accepts the quote offered by lender 130.

Financial manager 140 may interact with financial manager 140's user device 115 to communicate with customer 120, agent 125, lender 130, and/or lending system 135, in accordance with certain embodiments. In certain embodiments, financial manager 140 may assist with interactions between customer 120 and lending system 135. For example, lending system 135 may provide financial manager 140 with access to information that customer 120 has submitted to lending system 135. Financial manager 140 may review the information to determine whether customer 120 may benefit from assistance. For example, financial manager 140 may check whether customer 120 has made any errors or omissions in the information submitted to lending system 135. If financial manager 140 determines that customer 120 may benefit from assistance, financial manager 140 may contact customer 120 and offer assistance. In certain embodiments, financial manager 140 may be a type of lender 130. Thus, in addition to performing functionality of a financial manager described herein, financial manager 140 may also be able to perform functionality of a lender 130, such as authorizing use of his or her signature on a pre-approval letter, submitting a quote in order to bid on the opportunity to complete a loan with customer 120, and completing a loan process with customer 120 if customer 120 accepts financial manager 140's quote.

In certain embodiments, lending system 135 applies a pre-approval policy to determine one or more loan products for which customer 120 is pre-approved. In certain embodiments, lending system 135 comprises an underwriting engine that matches customer 120 to one or more loan products for which customer 120 is pre-approved. For example, the underwriting engine may be configured to compare customer 120's credit score and debt-to-income profile to determine one or more appropriate loan products. Lending system 135 provides agent 125 with information about the loan products for which customer 120 is pre-approved. For example, lending system 135 may provide pre-approval information to agent 125 via agent 125's user device 115. The pre-approval information may comprise a pre-approval letter and/or pre-approval information that enables agent 125 to dynamically generate a pre-approval letter. For example, the pre-approval information may comprise a maximum pre-approval amount for which a customer 120 qualifies. This may enable agent 125 to dynamically generate pre-approval letters in amounts less than or equal to the maximum pre-approval amount. The dynamically generated letters are signed with the signature and license number of one of the lenders 130, such as the signature and license of financial manager 140. In this manner, the pre-approval letters maintain the gravitas of being signed by a licensed party. However, the pre-approval letters can be dynamically generated based on the results of lending system 135 applying the approved pre-approval policy (without having to go back and forth with lender 130/financial manager 140 for each pre-approval letter). When customer 120 is ready to proceed with the loan process, lending system 135 facilitates connecting customer 120 with a lender 130 of customer 120's choice.

Figure 6:
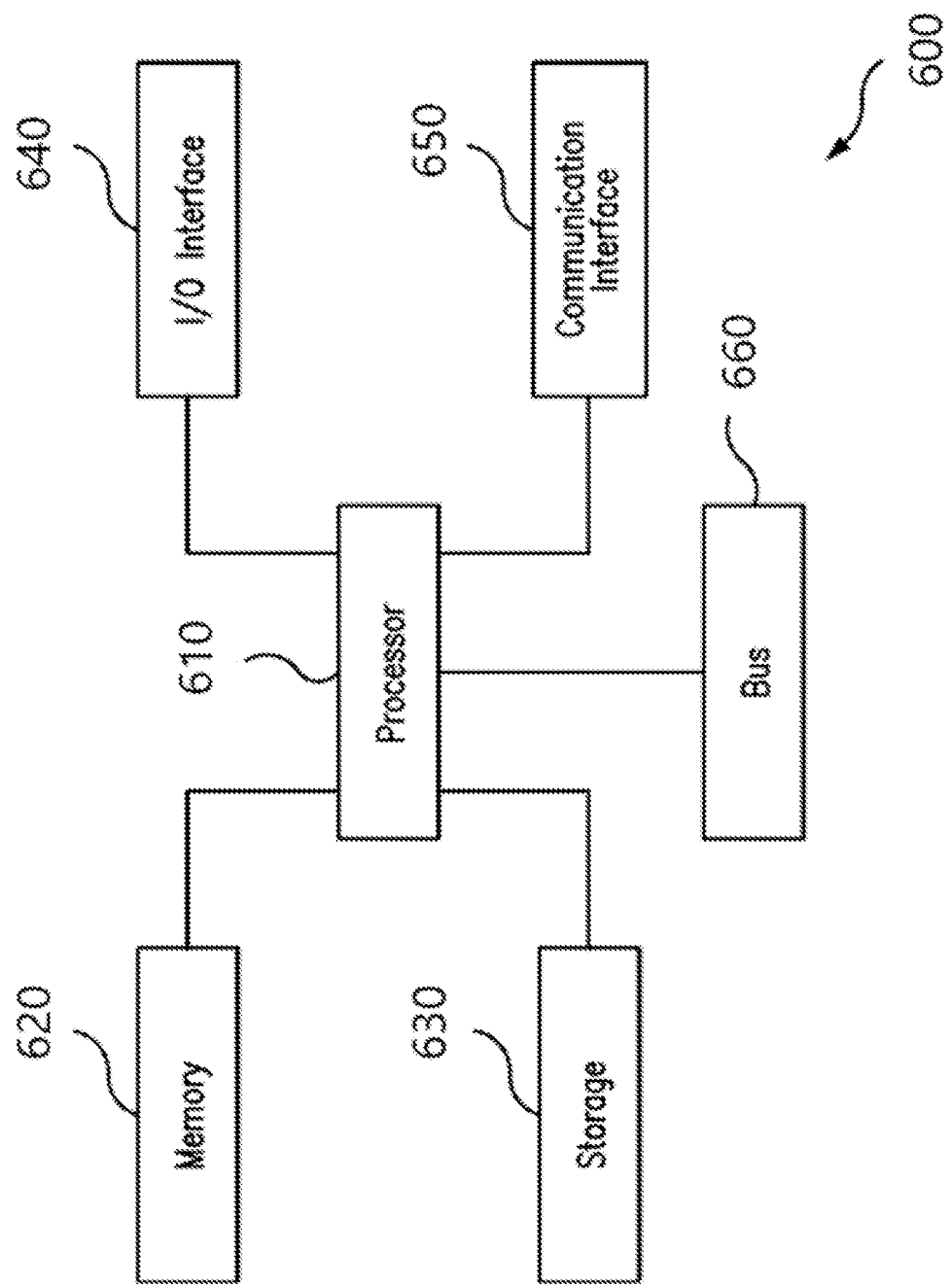
FIG. 6 is a block diagram illustrating an example computer system 600, in accordance with certain embodiments.

Lending system 135 may be implemented using a computer system, such as computer system 600 described with respect to FIG. 6. In certain embodiments, lending system 135 may comprise one or more servers. In general, a server may comprise hardware and/or software for performing processing tasks or providing computer services via network 110. As an example, a server may be a cloud-based server that performs processing tasks or computer services via the Internet. More generally, lending system 135 may comprise any software and/or hardware suitable for performing the functionality of lending system 135 described herein.

In certain embodiments, system 100 may be implemented as an IntroLend™ system. Additional examples of functionality of various embodiments of the components of system 100 are further described below with respect to FIGS. 2, 3, and 4a-4b.

FIGS. 2, 3, and 4a-4b illustrate examples of messages that may be exchanged among user devices 115 and lending system 135, in accordance with certain embodiments. Certain embodiments may combine functionality from various figures. As an example, steps of FIG. 2 (e.g., where customer 120 establishes an account with lending system 135) may be combined with steps of FIG. 3 (e.g., where customer 120 is pre-approved for a loan). As another example, step 306 of FIG. 3 (e.g., related to creating an adjustable pre-approval letter) may be combined with steps 407-417 of FIGS. 4a-4b (e.g., which provide details about creating and using the adjustable pre-approval letter).

Figure 2:
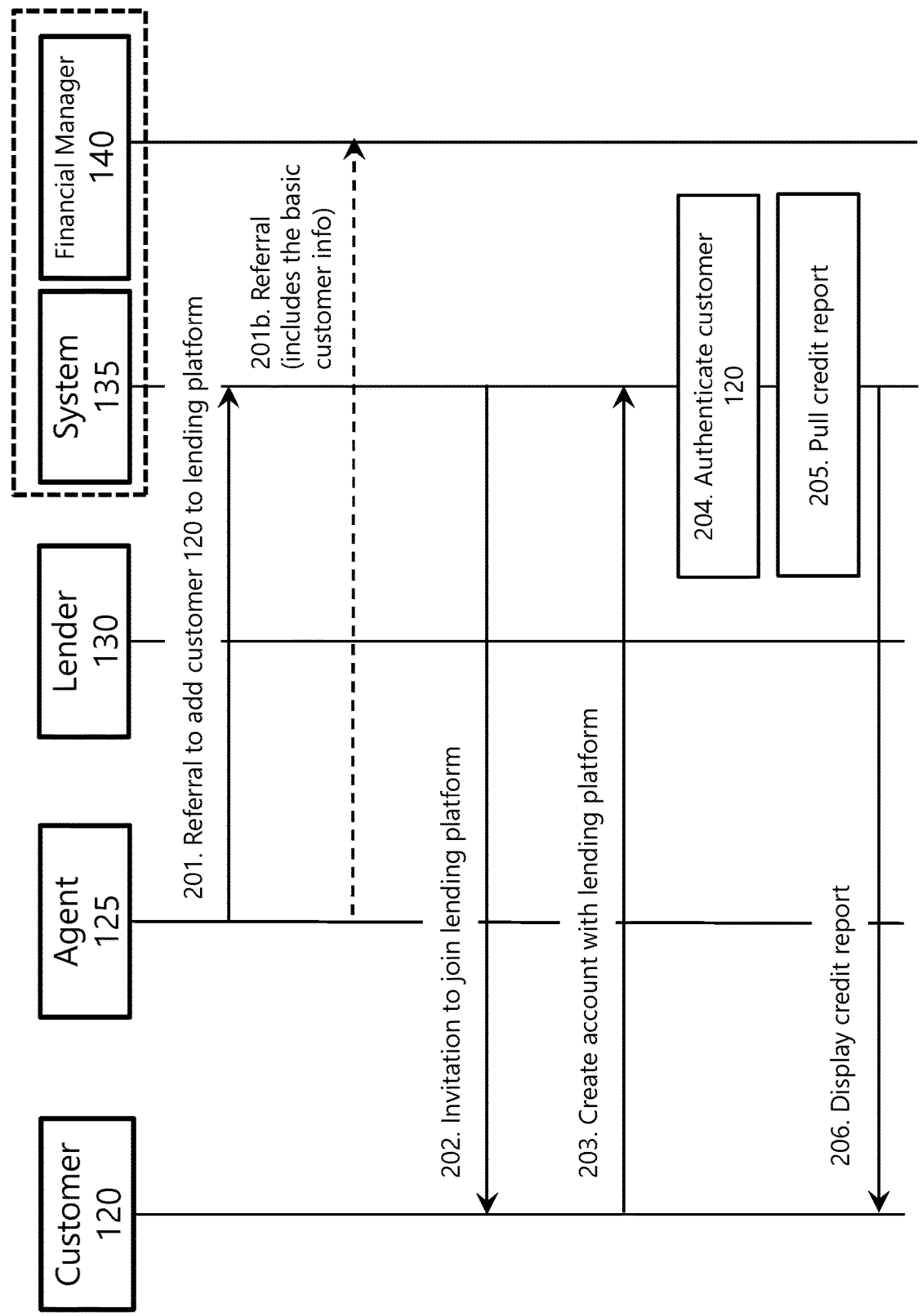
FIG. 2 illustrates a message flow diagram showing examples steps for registering a customer with a lending platform, in accordance with certain embodiments.

FIG. 2 illustrates an example of a message flow for creating a customer account associated with a lending platform, in accordance with certain embodiments. In certain embodiments, a customer 120, such as a home buyer, may be working with an agent 125, such as a real estate agent assisting customer 120 to purchase a home. Agent 125 may be a member of the lending platform and may facilitate inviting customer 120 to join the lending platform.

At step 201, agent 125 sends a referral to lending system 135, and at step 201b agent 125 sends a referral to financial manager 140. A referral indicates that agent 125 is inviting customer 120 to join the lending platform. The referral may include basic information about customer 120, such as name and contact information. Lending system 135 may use the information in the referral to begin preparing an account for customer 120. Financial manager 140 may use the information in the referral to assist customer 120 in creating an account with the lending platform and/or performing a loan pre-approval process. The information provided to lending system 135 in the referral of step 201 may be the same as the information provided to financial manager 140 in the referral of step 201b, or each referral may include different information tailored to its respective recipient.

Figure 7:
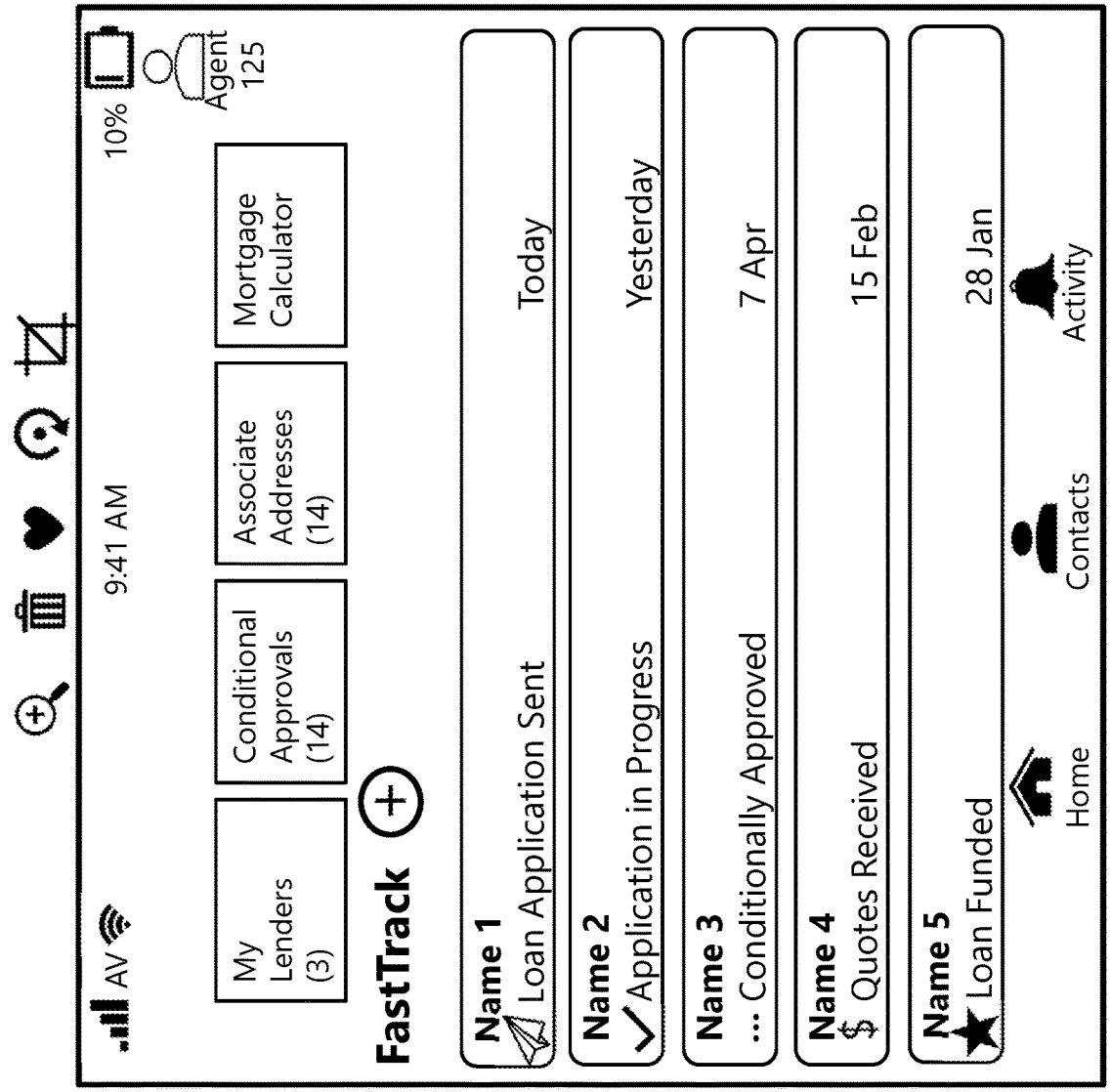
FIGS. 7-9 illustrate examples of graphical user interfaces that may be used to manage pre-approvals, in accordance with certain embodiments.

An example of an interface that agent 125 may use to initiate sending one or more referrals is shown in FIG. 7 (e.g., "FastTrack" feature). Certain embodiments of the interface may trigger sending both referrals in response to the same input from agent 125. Other embodiments of the interface may have separate inputs, one that triggers sending a referral to lending system 135, and another that triggers sending a referral to financial manager 140.

Although FIG. 2 illustrates agent 125 initiating both referral 201 and referral 201b, other options are possible. In some embodiments, agent 125 may send a referral to lending system 135, and lending system 135 may provide the referral (or a portion of the referral) to financial manager 140. Alternatively, agent 125 may send a referral to financial manager 140, and financial manager 140 may provide the referral (or a portion of the referral) to lending system 135. Additionally, one or both referrals may be optional in certain embodiments. As an example, in certain embodiments, agent 125 may simply invite customer 120 to join the lending platform (e.g., skip to step 202) without performing a referral process. As another example, customer 120 may initiate contact with lending system 135 and/or financial manager 140 without having to go through agent 125. As an example, customer 120 may visit a website or download an app that enables customer 120 to initiate contact with lending system 135 (e.g., skip to step 203).

Figure 11:
FIG. 11 illustrates an example of a graphical user interface inviting a customer to join a lending platform, in accordance with certain embodiments.
Figure 11:
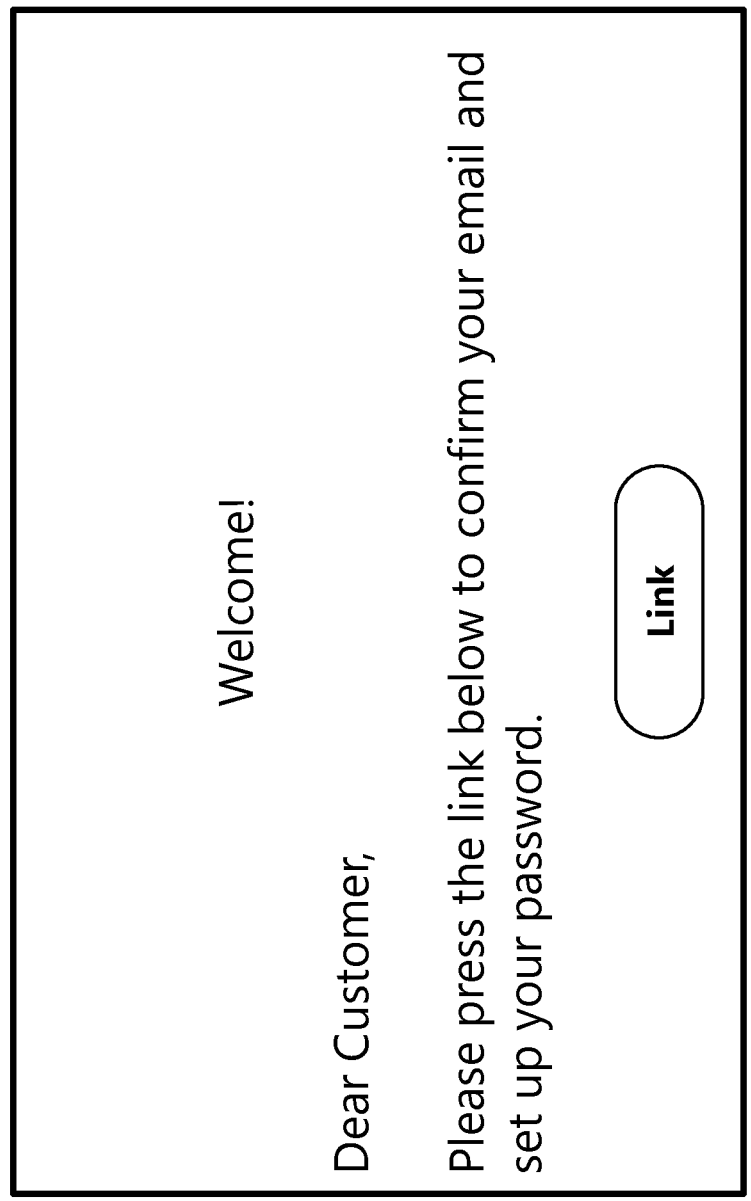

At step 202, agent 125 sends customer 120 an invitation to join the lending platform. In certain embodiments, the invitation that customer 120 receives in step 202 comprises an email message or text message containing a web address or a link to a website for creating the account. An example of a graphical user interface that may be used by agent 125 to invite customer 120 to join the lending platform is shown in FIG. 10, and an example of a graphical user interface that may be used by customer 120 to receive the invitation is shown in FIG. 11. Although FIG. 2 illustrates agent 125 sending an invitation to customer 120, other options are possible. Lending system 135 or financial manager 140 may send the invitation to customer 120, for example, in response to receiving a referral to invite customer 120 to join the lending platform. In embodiments where customer 120 initiates contact with lending system 135 (e.g., by visiting a website or downloading an app without having to go through a referral process), the invitation step may be omitted.

At step 203, customer 120 communicates with lending system 135 to proceed with creating the account. Creating an account may involve obtaining information from customer 120, such as a user name and password for the account. When creating the account, customer 120 may authorize lending system 135 to share certain personally identifiable information or financial information with customer 120's agent 125, financial manager 140, or selected lender 130 (after customer 120 has selected lender 130). Creating the account may also involve authenticating customer 120, as shown in step 204. To authenticate customer 120, lending system 135 verifies that customer 120 is who he/she says. For example, lending system 135 may authenticate customer 120 based on information received in the referral of step 201 and/or based on other suitable information.

In some embodiments, the method may continue to step 205 where lending system 135 contacts one or more credit bureaus to obtain one or more credit reports associated with customer 120. The credit report(s) can be used to facilitate a pre-approval process, a loan process, or both. In some embodiments, lending system 135 sends the credit report(s) to be displayed to customer 120 in step 206.

Figure 3:
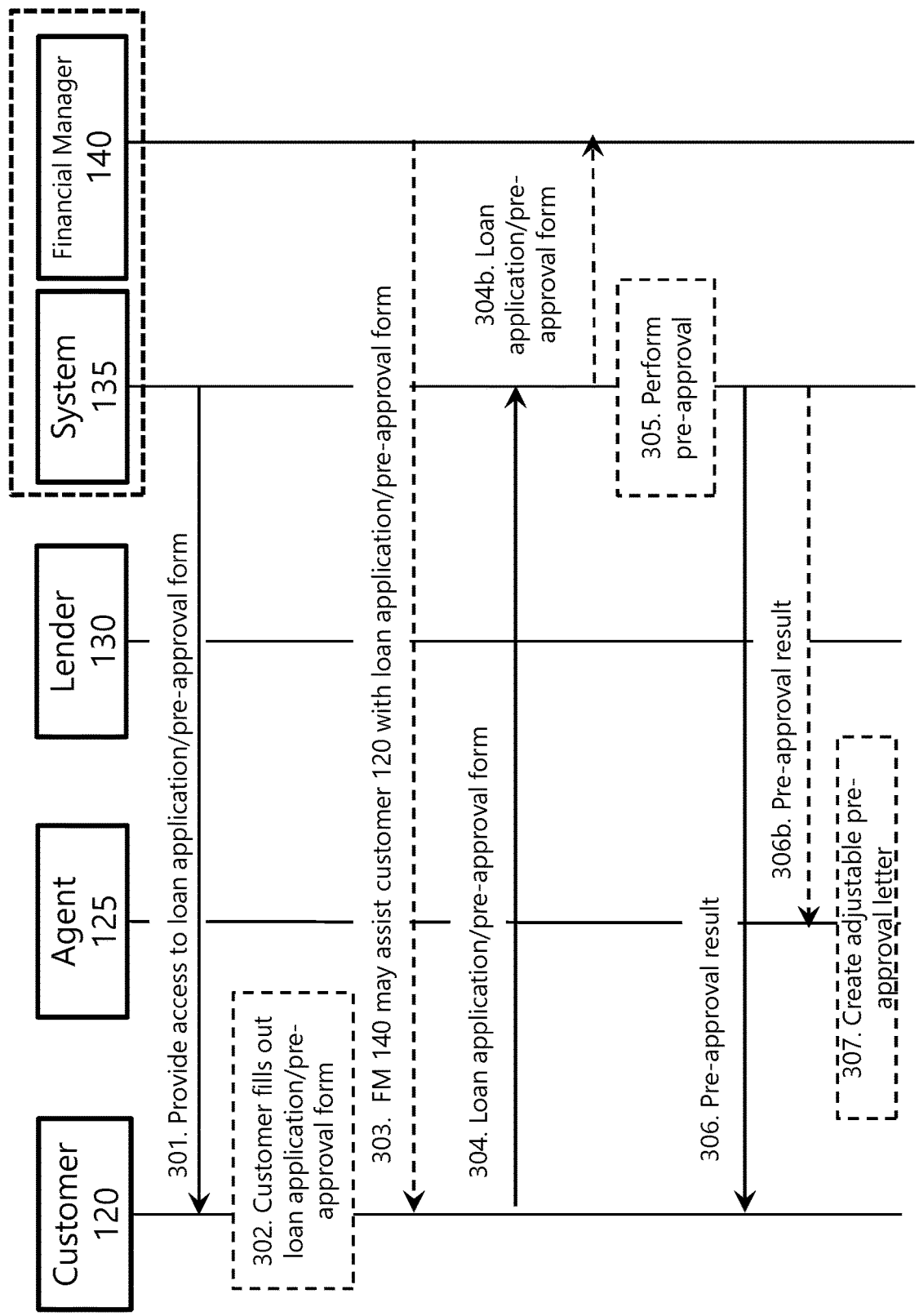
FIG. 3 illustrates a message flow diagram showing example steps of a pre-approval process, in accordance with certain embodiments.

FIG. 3 illustrates an example of a message flow for providing a pre-approval, in accordance with certain embodiments. The method begins at step 301 where lending system 135 provides customer 120 with access to a loan application and/or a pre-approval form. In some embodiments, lending system 135 provides customer 120 with access to the loan application and/or pre-approval form via a web interface. For example, customer 120 may login to customer 120's account with lending system 135 to access a webpage that collects the information for the loan application and/or pre-approval form. The loan application may collect information that will be of interest to lenders 130 when the time comes to prepare quotes for or extend a loan to customer 120. For example, the loan application may collect detailed information about customer 120's financials as well as corroborating documentation. The pre-approval form may be a simpler form that collects sufficient information to determine a loan amount for which customer 120 is pre-approved, with the understanding that a pre-approval is not a guaranteed offer of a loan. FIGS. 12-14 illustrate examples of screen captures from a graphical user interface that may be used to collect the information for the loan application and/or pre-approval form.

At step 302, customer 120 fills out the loan application or pre-approval form. In some embodiments, customer 120 may provide initial information, such as pre-approval information, at step 302. Customer 120 may then provide supplemental information at a later step. As an example, customer 120 may provide a full set of corroborating documentation required to complete the loan application after the customer 120 has selected a lender 130 and initiated the process of completing the loan (which customer 120 may choose to initiate after customer 120's offer has been accepted by the seller of the home).

At step 303, financial manager 140 may assist customer 120 with the loan application/pre-approval form. As an example, in one embodiment, financial manager 140 receives a referral containing contact information for customer 120 (e.g., step 201*b* of FIG. 2), and financial manager 140 may check to see whether customer 120 would like assistance if customer 120 has not submitted the loan application/pre-approval form within a predetermined amount of time from when financial manager 140 received the referral. In another embodiment, lending system 135 may send financial manager 140 a notification when customer 120 accesses the loan application/pre-approval form and, in response to the notification, financial manager 140 may check to see whether customer 120 would like assistance. Financial manager 140 may assist customer 120 by answering questions that customer 120 may have about the form (e.g., via phone, email, text, chat, etc.) and/or by collecting information from customer 120 so that financial manager 140 may enter the information into the lending platform on customer 120's behalf.

At step 304, customer 120 submits the completed loan application/pre-approval form to lending system 135. Customer 120 authorizes lending system 135 to perform a pre-approval process and/or to match customer 120 with lenders 130. Optionally, lending system 135 may provide financial manager 140 with access to customer 120's loan application/pre-approval form (step 304*b*). As an example, lending system 135 may provide an interface that allows financial manager 140 to login and view customer 120's loan application/pre-approval form. Financial manager 140 may review the loan application/pre-approval form to make sure that it is accurate and complete. If financial manager 140 discovers an error, financial manager 140 may correct the error or contact customer 120 to assist customer 120 in correcting the error.

At step 305, lending system 135 performs a pre-approval. In certain embodiments, performing the pre-approval includes performing a credit check. For example, lending system 135 may contact one or more credit bureaus to obtain one or more credit reports associated with customer 120. Certain embodiments may obtain credit reports at multiple points in the process (such as in step 204 of FIG. 2 and in step 305 of FIG. 3). As an example, certain embodiments may contact one credit bureau in step 204 and a different credit bureau in step 305 to obtain further information or to determine whether the credit reports contain different information. As another example, certain embodiments may determine to pull a second credit report at step 305 if the amount of time that has elapsed since the credit report was pulled in step 204 exceeds a threshold. As another example, certain embodiments will omit the credit check in step 204 of FIG. 2 and will wait until step 305 of FIG. 3 to pull the credit report(s). As yet another example, certain embodiments will pull the credit report(s) in step 204 of FIG. 2 and will omit step 305 of FIG. 3. Lending system 135 may merge the information obtained from the credit report(s) with information received from customer 120 via the loan application/pre-approval form in order to have comprehensive information about customer 120.

In certain embodiments, performing the pre-approval includes applying a pre-approval policy. The pre-approval policy comprises a set of objective rules for determining whether a customer 120 qualifies for one or more loan products. In certain embodiments, the pre-approval policy may be based at least in part on one or more guidelines set by a government-sponsored enterprise, such as FANNIE MAE and/or FREDDIE MAC. Examples of such guidelines may include rules about maximum amounts that can be borrowed depending on the borrower's city or state of residence. In certain embodiments, the pre-approval policy may be based at least in part on one or more criteria specified by financial manager 140 or lender 130. In general, the objective rules in the pre-approval policy are at least as strict (and are often stricter) than the lending guidelines followed by each of the lenders 130. Thus, if the pre-approval policy indicates that a customer 120 would likely qualify for a maximum loan amount of $X, the lenders 130 may actually be willing to extend the customer 120 a loan of $X plus 10%, for example. In this manner, the pre-approval policy avoids the risk of lender 130 ultimately deciding that customer 120 does not qualify for a loan at the maximum loan amount indicated in the pre-approval.

Once a pre-approval policy has been established and agreed to by financial manager 140 and lenders 130, lending system 135 can perform pre-approvals for customers 120 without having to go back to financial manager 140 or lender 130 to authorize each pre-approval. Financial manager 140 and lenders 130 may agree to the pre-approval policy expressly (e.g., clicking a link to accept the policy) or implicitly (e.g., accepting the pre-approval policy may be an implicit condition of providing services via the lending platform). By establishing the pre-approval policy in advance, processing circuitry of lending system 135 may perform the pre-approval in real-time in response to receiving customer 120's completed loan application/pre-approval form, without requiring any human involvement. Thus, the pre-approval result can be communicated to customer 120 and/or agent 125 with little to no delay.

Applying the pre-approval policy enables lending system 135 to determine one or more loan products for which customer 120 qualifies for pre-approval. Applying the policy may comprise using customer 120's information (such as customer 120's financial information) as input into the objective rules and determining a result. In certain embodiments, the objective rules comprise an underwriting analysis to determine customer 120's lending capacity and best loan product. Examples of loan products may include 30-Year Fixed Rate, 20-Year Fixed Rate, 15-Year Fixed Rate, 10/1 ARM Rate, 7/1 ARM Rate, 5/1 ARM Rate, 30-Year VA Rate, 30-Year FHA Rate, 30-Year Fixed Jumbo Rate, 15-Year Fixed Jumbo Rate, 7/1 ARM Jumbo Rate, 5/1 ARM Jumbo Rate, or other loan products. In certain embodiments, a loan product may be associated with a loan amount and an interest rate. As an example, suppose that customer 120 is not a veteran. Lending system 135 applying the pre-approval policy may determine that customer 120 does not qualify for a VA loan because customer 120 is not a veteran. As another example, based on customer 120's financial information, lending system 135 applying the pre-approval policy may determine that customer 120 qualifies for pre-approval of a 30-Year Fixed Rate in the amount of $X, a 20-Year Fixed Rate in the amount of $Y, a 15-Year Fixed Rate in the amount of $Z, and so on.

In certain embodiments, lending system 135 may determine the one or more loan products for which customer 120 qualifies for pre-approval before customer 120 decides which lender 130 to work with. Thus, the pre-approval is not based on the lender 130 that customer 120 ultimately ends up working with. Rather, the pre-approval is based on information that customer 120 provides in the pre-approval application, such as customer 120's financial information.

At step 306, lending system 135 communicates a pre-approval result to customer 120. Optionally, certain embodiments communicate the pre-approval result to customer 120's agent 125 (step 306b). The pre-approval result provides pre-approval information, such as the maximum pre-approval amount for which customer 120 qualifies for pre-approval. If customer 120 qualifies for pre-approval of multiple types of loan products (e.g., 30-Year, 20-Year, and 15-Year Fixed Rate, etc.), lending system 135 may determine the maximum pre-approval amount among all of these loan products and communicate that value in step 306 and/or step 306b. Thus, if customer 120 qualifies for pre-approval in amounts of $900,000, $950,000 and $1,000,000, e.g., depending on the loan product, lending system 135 indicates that the maximum pre-approval amount for customer 120 is $1,000,000. Optionally, lending system 135 communicates additional pre-approval information, such as issue date, down payment, total purchase price, and/or interest rate information. Optionally, lending system 135 communicates pre-approval information for multiple types of loan products for which customer 120 qualifies for pre-approval. This information may assist customer 120 in evaluating how much to offer on a house (e.g., based on the types of loan terms customer 120 may ultimately qualify for).

Certain embodiments enable customer 120 and/or agent 125 to create an adjustable pre-approval letter. FIG. 3 illustrates an example where agent 125 creates an adjustable pre-approval letter in step 307. For example, customer 120 indicates to agent 125 that customer 120 would like to make an offer on a home being sold by seller. Customer 120 indicates to agent 125 an offer amount. Suppose that customer 120 would like to make an offer of $700,000 to seller. In creating the adjustable pre-approval letter, agent 125 selects an adjusted pre-approval amount less than or equal to the maximum pre-approval amount received from lending system 135 in the pre-approval result of step 306b. Continuing with the example, agent 125 selects an adjusted pre-approval amount less than or equal to $1,000,000. Agent 125 may select the adjusted pre-approval amount based on agent 125's expertise and/or based on an amount suggested by customer 120. In certain embodiments, agent 125 may set the pre-approval amount to a value that is sufficient to cover the $700,000 that customer 120 plans to offer on the house, but lower than the maximum $1,000,000 amount for which customer 120 is pre-approved. For example, agent 125 may decrease the loan pre-approval amount from $1,000,000 to $750,000. In this manner, agent 125 prevents the seller from knowing that customer 120a qualifies for a higher loan amount and avoids giving the seller a reason to increase the price.

The pre-approval letter created by agent 125 includes information indicating that the pre-approval letter maintains the gravitas of a letter issued by a lender 130, such as financial manager 140. For example, the pre-approval letter includes lender 130's signature and/or license number. Generating the pre-approval letter is performed without any back-and-forth with lender 130. That is, because lender 130 previously approved lending system 135 to apply the pre-approval policy, lender 130's signature may automatically be signed to a pre-approval letter for an amount less than or equal to the maximum amount obtained by applying the approved pre-approval policy. In certain embodiments, the pre-approval letter may be generated in the form of an electronic document, such as a read-only PDF with the data pre-filled.

In certain embodiments, agent 125 may generate the pre-approval letter by sending lending system 135 a request to provide the pre-approval letter. The request indicates the adjusted pre-approval amount to include in the letter. Lending system 135 may automatically respond in real-time. For example, lending system 135 may optionally verify the request (e.g., to confirm that the adjusted pre-approval amount is less than or equal to the maximum pre-approval amount), generate the pre-approval letter with the adjusted pre-approval amount, and send the pre-approval letter to agent 125.

In other embodiments, agent 125 may generate the pre-approval at agent 125's user device 115. In an embodiment, lending system 135 may send agent 125 a pre-approval letter as an electronic form that includes an editable pre-approval amount. For example, the electronic form may be sent with the pre-approval information in step 306b. The editable pre-approval amount may enable an application running on agent 125's user device 115 to locally generate a pre-approval letter with the adjusted pre-approval amount less than or equal to the maximum pre-approval amount (e.g., the electronic form may be configured to prevent the application running on agent 125's user device 115 from generating a pre-approval letter with a pre-approval amount above the maximum pre-approval amount).

Agent 125's user device 115 may provide any suitable user interface for dynamically generating a pre-approval letter. In certain embodiments, the user interface displays pre-approval information received from lending system 135, such as a maximum pre-approval amount ($1,000,000), a down payment amount (e.g., $200,000), and a date that the pre-approval was issued (e.g., Jan. 1, 2020). The user interface may provide an adjustable pre-approval field where agent 125 selects the adjusted pre-approval amount. As an example, the adjustable pre-approval field may comprise a slider that the user can drag to decrease the pre-approval amount from the maximum pre-approval amount to a lower amount, such as $750,000. After agent 125 has selected the adjusted pre-approval amount, agent 125 may select a button (e.g., "View Letter") to generate a pre-approval letter that is signed by a lender 130 (financial manager 140 or another lender 130) associated with lending system 135. The pre-approval letter indicates that customer 120 has been pre-approved for a loan of the adjusted pre-approval amount (e.g., $750,000).

Agent 125 may share the pre-approval letter with whomever customer 120 would like the pre-approval letter to be shared. For example, agent 125 may email or upload the pre-approval letter or print and mail the pre-approval letter to customer 120, the seller and/or seller's agent, or lender 130. The seller may accept, reject, or counter the offer. If the seller rejects customer 120's offer, customer 120 may decide to increase the offer amount or to make an offer on another house at another price. Agent 125 can dynamically create a new pre-approval letter with an adjusted pre-approval amount closer to the price of the new offer. For example, agent 125 can return to the letter-generating screen on agent 125's user device 115 and drag the adjusted pre-approval amount to the amount of the new offer. Thus, pre-approval letters for customer 120a may be generated in different amounts (less than or equal to the maximum) without requiring any back-and-forth with lender 130 or lending system 135, and without customer 120 having to submit a new application for a different pre-approval amount.

As discussed above, the pre-approval process allows customer 120 to submit a pre-approval letter with an offer to the seller, which indicates to the seller that customer 120 can afford the offer price. Once the seller accepts customer 120's offer, customer 120 may be ready to proceed with the loan process. In certain embodiments, lending system 135 facilitates connecting customer 120 with lender 130 and exchanging information required to complete and fund the loan.

Figure 4A:
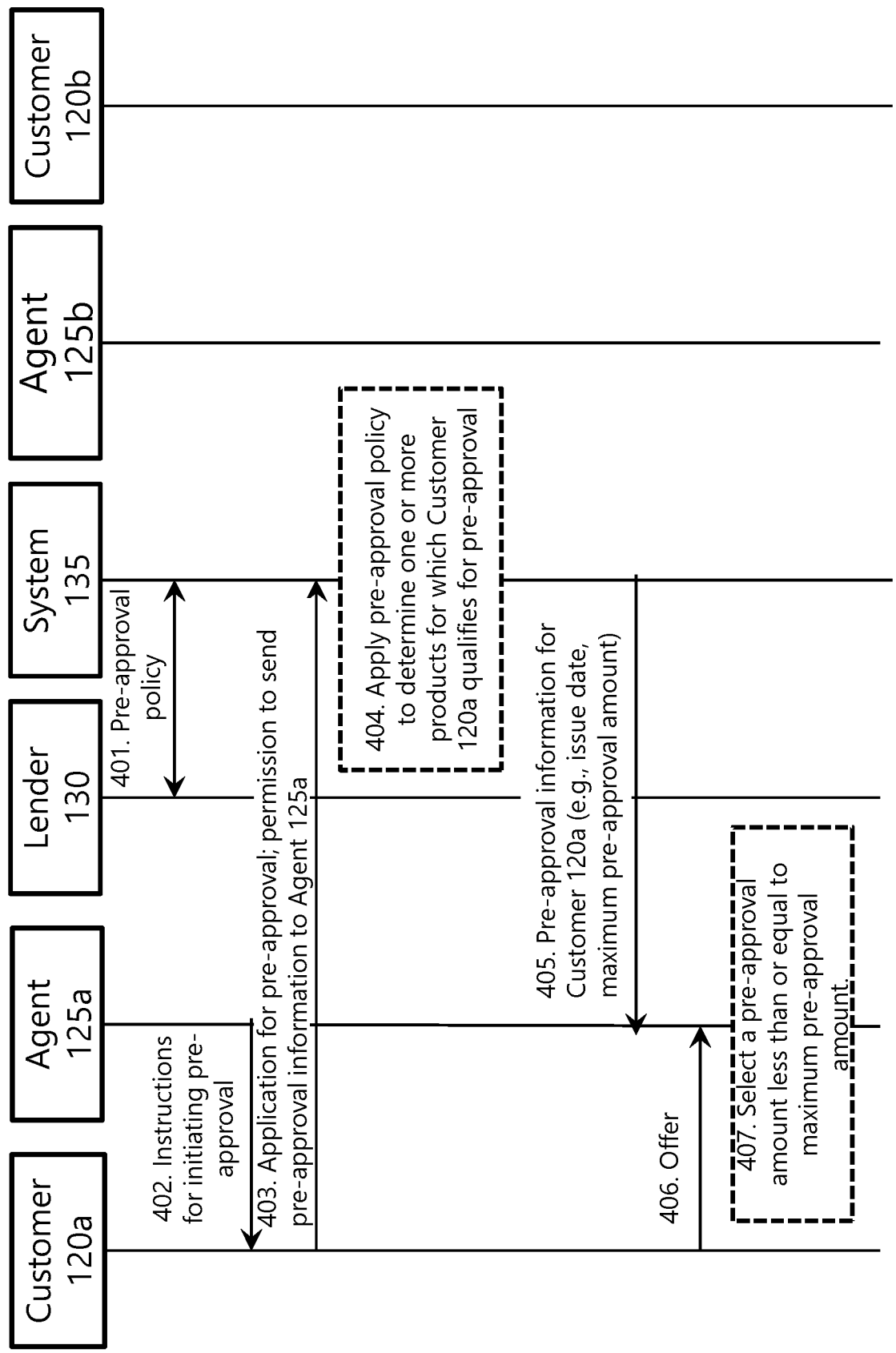
FIGS. 4a-4b illustrate a message flow diagram showing examples steps for dynamically generating a pre-approval letter, in accordance with certain embodiments.
Figure 4B:
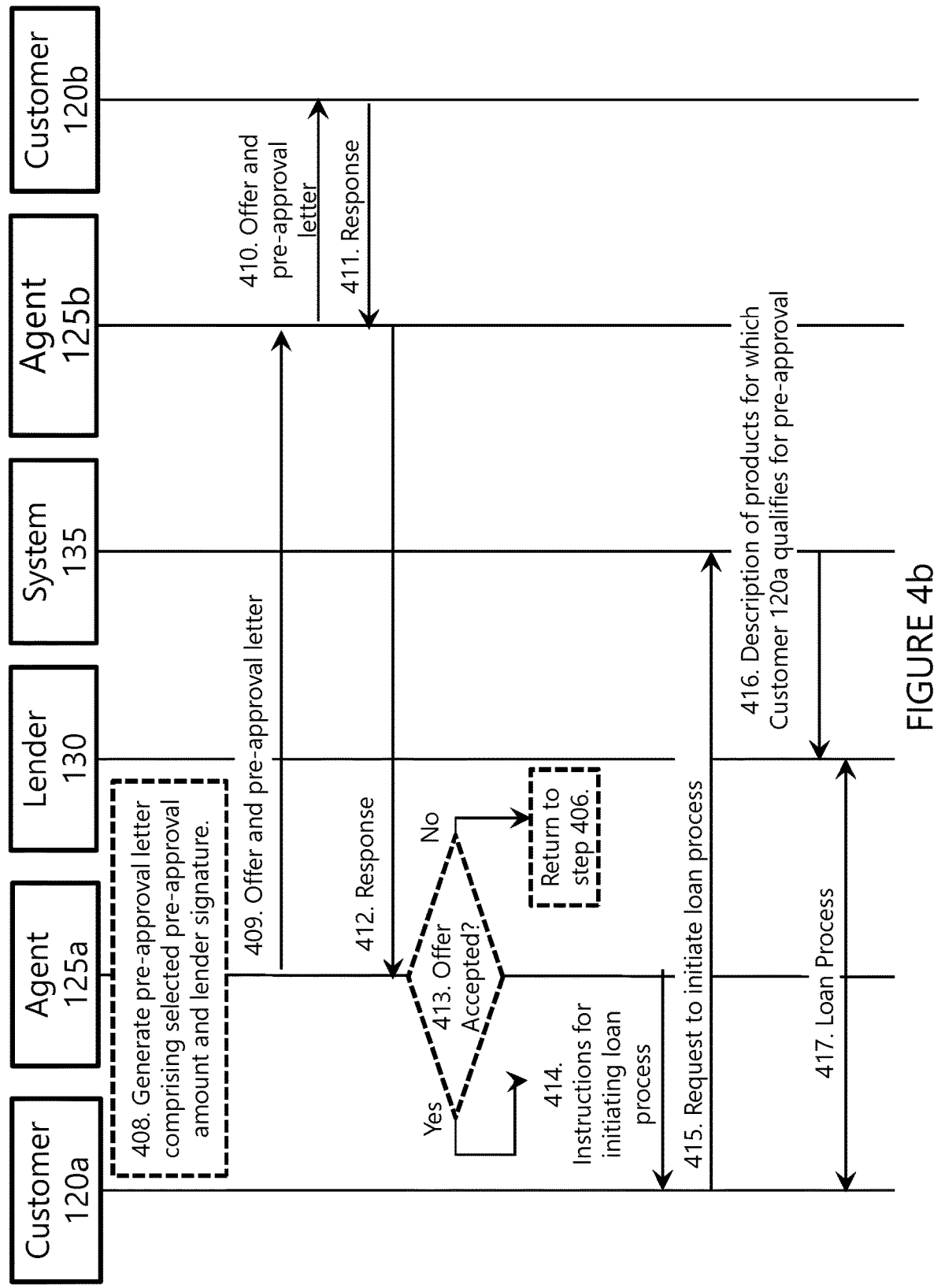

FIGS. 4a-4b illustrate a message flow diagram showing another example of steps that may be used to dynamically generate a pre-approval letter, in accordance with certain embodiments. In FIGS. 4a-4b, customer 120a may be a home buyer, agent 125a may be a real estate agent employed by customer 120a, lender 130 may be a lender that ultimately extends a loan to customer 120a, lending system 135 may be a server that facilitates managing pre-approval for the loan, agent 125b may be a real estate agent employed by customer 120b, and customer 120b may be a seller that is selling a home.

At step 401, lender 130 approves a pre-approval policy to be applied by lending system 135. As an example, lender 130 may expressly approve a pre-approval policy. As another example, lender 130 may implicitly approve a pre-approval policy by registering to participate in a loan platform, such as IntroLend™. The pre-approval policy comprises a set of objective rules for determining whether a customer 120 qualifies for one or more loan products. For example, the objective rules may be based on one or more guidelines set by a government-sponsored enterprise and/or one or more criteria specified by financial manager 140 or lender 130, as described above with respect to 305 of FIG. 3. After lender 130 and lending system 135 have established/agreed to a pre-approval policy, the remaining steps of FIGS. 4a-4b may be repeated multiple times (without having to repeat step 401). For example, in certain embodiments, lender 130 need only approve the pre-approval policy one time upfront. In other embodiments, step 401 may optionally be repeated from time-to-time, for example, on an annual basis to renew a relationship with lender 130 or in the event that the pre-approval policy changes.

At step 402, agent 125a sends customer 120a instructions for initiating pre-approval for a loan. As an example, the instructions may be in the form of an email or text message containing a link to a pre-approval application used by lending system 135. Customer 120a completes the application for pre-approval. The application for pre-approval may include (or may enable lending system 135 to obtain) identification information (e.g., name, social security number) and financial information (e.g., income, assets, debt, credit score) associated with customer 120a. In certain embodiments, the application for pre-approval comprises a digital mortgage application form. In certain embodiments, customer 120a fills out the pre-approval application via a web portal or customer 120a's smartphone, for example.

In an alternative embodiment, agent 125a facilitates providing customer 120a with the pre-approval application form, for example, by identifying customer 120a to lending system 135, which prompts lending system 135 to invite customer 120a to fill out the pre-approval application. This embodiment is further described above with respect to FIGS. 2-3.

At step 403, customer 120a provides the pre-approval application to lending system 135. In certain embodiments, customer 120a also provides lending system 135 with permission to send pre-approval results to customer 120a's agent 125a. The permission may be sent with the pre-approval application or in a separate message (such as a message generated when customer 120a registered customer 120a's account with lending system 135). In certain embodiments, in response to receiving the pre-approval application, lending system 135 contacts one or more credit bureaus to obtain one or more credit reports associated with customer 120*a*. Lending system 135 may then merge the pre-approval application and the credit report(s) for use in step 404.

At step 404, lending system 135 applies the pre-approval policy to determine one or more loan products for which customer 120*a* qualifies for pre-approval. Applying the policy may comprise using customer 120*a*'s information (such as customer 120*a*'s financial information) as input into the objective rules and determining a result. In certain embodiments, the objective rules comprise an underwriting analysis to determine the customer's lending capacity and best loan product. As an example, based on customer 120*a*'s financial information, lending system 135 applying the pre-approval policy may determine that customer 120*a* qualifies for pre-approval of a 30-Year Fixed Rate in the amount of $X, a 20-Year Fixed Rate in the amount of $Y, a 15-Year Fixed Rate in the amount of $Z, and so on. Further examples of loan products are described above (see step 305 of FIG. 3).

In certain embodiments, lending system 135 may determine the one or more loan products for which customer 120*a* qualifies for pre-approval before customer 120*a* decides which lender 130 to work with. Thus, the pre-approval is not based on the lender 130 that customer 120*a* ultimately ends up working with. Rather, the pre-approval is based on information that customer 120*a* provides in the pre-approval application, such as customer 120*a*'s financial information.

At step 405, lending system 135 communicates pre-approval information for customer 120*a* to agent 125*a*. The pre-approval information comprises at least the maximum pre-approval amount for which customer 120*a* qualifies for pre-approval. The pre-approval result provides pre-approval information, such as the maximum pre-approval amount for which customer 120 qualifies for pre-approval. If customer 120 qualifies for pre-approval of multiple types of loan products (e.g., 30-Year, 20-Year, and 15-Year Fixed Rate, etc.), lending system 135 may determine the maximum pre-approval amount among all of these loan products and communicate that value in step 306 and/or step 306*b*. Thus, if customer 120 qualifies for pre-approval in amounts of $900,000, $950,000 and $1,000,000, e.g., depending on the loan product, lending system 135 indicates that the maximum pre-approval amount for customer 120 is $1,000,000. Optionally, lending system 135 communicates additional pre-approval information to agent 125, such as issue date, down payment, total purchase price, and/or interest rate information. Optionally, lending system 135 communicates pre-approval information for multiple types of loan products for which customer 120*a* qualifies for pre-approval. This information may assist customer 120*a* in evaluating how much to offer on a house (e.g., based on the types of loan terms customer 120*a* may ultimately qualify for).

Figure 5:
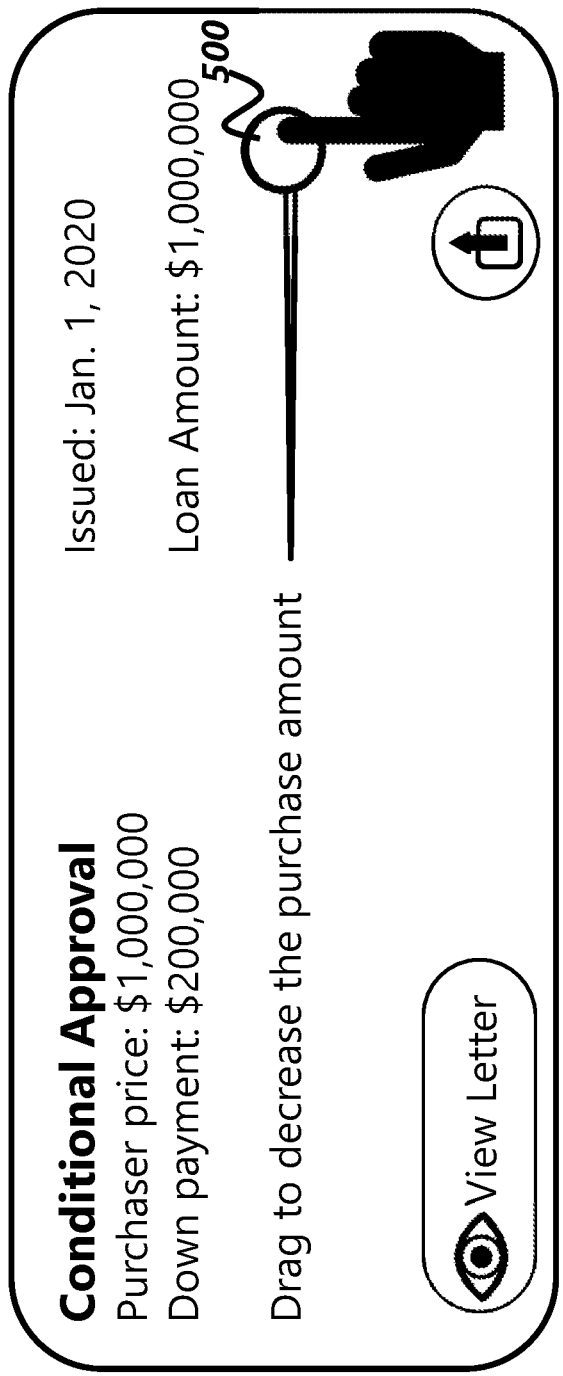
FIG. 5 illustrates an example of a graphical user interface that may be used to dynamically generate a pre-approval letter, in accordance with certain embodiments.

In certain embodiments, communicating the pre-approval information to agent 125*a* causes the graphical user interface shown in FIG. 5 to be generated on agent 125*a*'s device. In certain embodiments, the graphical user interface includes information about the pre-approval, such as the maximum pre-approval amount. In embodiments where customer 120*a* has not yet selected a lender 130 that the buyer plans to work with, the graphical user interface will not include information for any particular lender 130. Rather, the graphical user interface may indicate a generic pre-approval to be transferred to customer 120*a*'s preferred lender 130 after customer 120*a* has established a relationship with the lender.

Processing circuitry of lending system 135 may perform steps 404-405 in real-time in response to receiving the pre-approval application from customer 120*a*, without requiring any human involvement. Thus, the pre-approval information can be communicated to agent 125*a* with little to no delay.

At step 406, customer 120*a* indicates to agent 125*a* that customer 120*a* would like to make an offer on a home being sold by customer 120*b*. Customer 120*a* indicates to agent 125*a* an offer amount. For example, suppose that customer 120*a* would like to make an offer of $700,000 to customer 120*b*.

At step 407, agent 125*a* selects an adjusted pre-approval amount less than or equal to the maximum pre-approval amount received from lending system 135 in step 405. Continuing with the example maximum pre-approval amount of $1,000,000, agent 125*a* selects an adjusted pre-approval amount less than or equal to $1,000,000. Agent 125*a* may select the adjusted pre-approval amount based on agent 125*a*'s expertise and/or based on an amount suggested by customer 120*a*. In certain embodiments, agent 125*a* may set the pre-approval amount to a value that is higher than the $700,000 that customer 120*a* plans to offer on the house, but lower than the maximum $1,000,000 amount for which customer 120*a* is pre-approved. For example, agent 125*a* may decrease the loan pre-approval amount from $1,000,000 to $750,000. In this manner, agent 125*a* may prevent customer 125*b* (the seller) from knowing that customer 120*a* (the buyer) qualifies for a higher loan amount and avoids giving customer 125*b* a reason to increase the price.

At step 408, agent 125*a* generates a pre-approval letter comprising the adjusted pre-approval amount ($750,000) selected in step 407. The pre-approval letter includes information indicating that the pre-approval letter maintains the gravitas of a letter issued by lender 130. For example, the pre-approval letter includes lender 130's signature and/or license number. Generating the pre-approval letter is performed without any back-and-forth with lender 130. That is, because lender 130 previously approved lending system 135 to apply the pre-approval policy, lender 130's signature may automatically be signed to a pre-approval letter for an amount less than or equal to the maximum amount obtained by applying the approved pre-approval policy. In certain embodiments, the pre-approval letter may be generated in the form of an electronic document, such as a read-only PDF with the data pre-filled.

In certain embodiments, agent 125*a* may generate the pre-approval letter by sending lending system 135 a request to provide the pre-approval letter. The request indicates the adjusted pre-approval amount to include in the letter. Lending system 135 may automatically respond in real-time. For example, lending system 135 may optionally verify the request (e.g., to confirm that the adjusted pre-approval amount is less than or equal to the maximum pre-approval amount), generate the pre-approval letter with the adjusted pre-approval amount, and send the pre-approval letter to agent 125*a*. In other embodiments, agent 125*a* may generate the pre-approval at agent 125*a*'s user device 115. In an embodiment, lending system 135 may send agent 125*a* a pre-approval letter as an electronic form that includes an editable pre-approval amount. For example, the electronic form may be sent with the pre-approval information in step 405. The editable pre-approval amount may enable an application running on agent 125*a*'s user device 115 to locally generate a pre-approval letter with the adjusted pre-approval amount less than or equal to the maximum pre-approval amount (e.g., the electronic form may be configured to prevent the application running on agent 125a's user device 115 from generating a pre-approval letter with a pre-approval amount above the maximum pre-approval amount).

Agent 125a may share the pre-approval letter with whomever customer 120a would like the pre-approval letter to be shared. For example, agent 125a may email the pre-approval letter or print and mail the pre-approval letter to customer 120a, customer 120b, agent 125b, and/or lender 130. Step 409 illustrates an example in which agent 125a sends the offer from step 406 (e.g., in the amount of $700,000) and the pre-approval letter from step 408 (e.g., in the amount of $750,000) to agent 125b (seller's real estate agent). At step 410, agent 125b forwards the offer and pre-approval letter to customer 120b. At step 411, customer 120b provides a response to agent 125b. For example, customer 120b may accept, reject, or counter the offer. At step 412, agent 125b forwards the response to agent 125a.

At step 413, agent 125a may review with customer 120a whether customer 120b accepted the offer. If customer 120b has rejected the offer (or if customer 120a rejects customer 120b's counter-offer), the method may return to step 406 to repeat the process. For example, customer 120a may make an offer on another home (e.g., being sold by a different seller) in another amount (e.g., $800,000), and agent 125a may dynamically generate another pre-approval letter with an adjusted pre-approval amount (e.g., $850,000 pre-approval), which is less than or equal to the maximum pre-approval amount ($1,000,000) received from lending system 135 in step 405. Thus, pre-approval letters for customer 120a may be generated in different amounts (less than or equal to the maximum) without requiring any back-and-forth with lender 130 or lending system 135, and without customer 120b having to submit a new application for a different pre-approval amount.

If at step 413 customer 120b has accepted the offer (or if customer 120a accepts customer 120b's counter-offer), the method proceeds to step 414. At step 414, agent 125a provides customer 120a with instructions for initiating a loan process. For example, agent 125a may refer customer 120a to one of agent 125a's preferred lenders 130 (which may be different than the lender 130 that signed the pre-approval letter). In certain embodiments, the instructions may include a link that enables customer 120a to request lending system 135 to initiate the loan process at step 415. Initiating the loan process may include providing authorization to lending system 135 to forward information to the preferred lender 130, such as identification information or financial information that customer 120a submitted to lending system 135 in step 403 or a description of the loan products for which customer 120a qualifies for pre-approval according to the determination in step 404. Lending system 135 provides the information to lender 130 in step 416. This allows lender 130 to take over the loan process from server 130. In step 417, lender 130 and customer 120a complete a loan process in which lender 130 extends a loan to customer 120a. Thus, customer 120a may obtain a pre-approval letter before deciding which lender 130 to work with and may later complete the loan process with a lender 130 of customer 120a's choice. This may allow customer 120a to obtain a pre-approval letter more quickly and efficiently than if customer 120a had to decide which lender 130 to work with upfront.

The above description has been provided for purposes of example and explanation. Modifications, additions, or omissions may be made to the methods described with respect to FIGS. 4a-4b. The steps may be performed in any suitable order, and methods may include more, fewer, or other steps. For example, in certain embodiments, the method may comprise steps 403-408 involving customer 120a, agent 125a, and server 130. In certain embodiments, steps different than those described with respect to steps 401-402 may be used to prepare customer 120a to send and lending system 135 to receive the application for pre-approval. As an example, lending system 135 may contact customer 120a to request the application for pre-approval (e.g., lending system 135 may initiate contact in response to a referral from agent 125a, in response to an inquiry from customer 120a, or in response to determining that customer 120a needs to supplement a previous pre-approval application). In certain embodiments, steps different than those described with respect to steps 409-413 may be used to communicate the pre-approval letter and response. As one example, the seller (customer 120b) does not necessarily need to be working through an agent 125b. In certain embodiments, steps different than those described with respect to steps 414-417 may be used to facilitate the loan process after the offer has been accepted. For example, in certain embodiments, lending system 135 may facilitate a bid process in which lenders 130 bid to be customer 120a's lender. Each lender 130 may bid a different price (e.g., a lender 130 may offer customer 120a better terms than indicated in the pre-approval letter). Certain embodiments may automatically pay agent 125a a referral fee for introducing customer 120a to a preferred lender 130 or a bidding platform.

FIG. 5 illustrates an example of a graphical user interface that may be used to dynamically generate a pre-approval letter, in accordance with certain embodiments. In certain embodiments, user device 115 receives pre-approval information from lending system 135. In the example illustrated in FIG. 5, the pre-approval information comprises a maximum pre-approval amount ($1,000,000), a down payment amount (e.g., $200,000), and a date that the pre-approval was issued (e.g., Jan. 1, 2020). The user may select an adjusted pre-approval amount by interacting with an adjustable pre-approval field. In the example of FIG. 5, the adjustable pre-approval field comprises a slider that the user can drag to decrease the pre-approval amount to an amount less than the maximum pre-approval amount, such as $750,000. After the user has selected the adjusted pre-approval amount, the user may select a button (e.g., "View Letter") to generate a pre-approval letter that is signed by a lender 130 associated with lending system 135. The pre-approval letter indicates the buyer (e.g., the user himself if customer 120 generated the letter, or a customer of the user if agent 125 generated the letter) has been pre-approved for a loan of the adjusted pre-approval amount (e.g., $750,000). After generating the letter and/or navigating back to the conditional approval display, certain embodiments reset the displayed loan amount to the maximum loan amount. In this manner, the application is ready for the user to select another adjusted pre-approval amount and generate another pre-approval letter, if the user decides to do so.

FIG. 6 is a block diagram illustrating an example computer system 600, according to certain embodiments. Computer system 600 may be used to implement one or more components of the system described in FIG. 1, such as a user device 115 or lending system 135. The functionality of a component may be implemented via programmable instructions configured to be executed by processing circuitry of computer system 600. Computer system 600 may be any suitable computing system in any suitable physical form. As example and not by way of limitation, computer system 600 may comprise a virtual machine (VM), an embedded computer system, a system-on-chip (SOC), a single-board computer system (SBC) (e.g., a computer-on-module (COM) or system-on-module (SOM)), a user device (e.g., a smartphone, a mobile telephone, a personal digital assistant (PDA), a tablet computer, a laptop computer, a desktop computer, etc.), a mainframe, a mesh of computer systems, a server, an application server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. Some or all of the steps of the methods described herein may be performed automatically. This disclosure recognizes that the automatic performance of such steps and/or functionalities may be associated with benefits such as a reduction in CPU resources, memory resources, and network bandwidth that would otherwise be required to perform these actions.

In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

Computer system 600 may include processing circuitry 610, memory 620, storage 630, an input/output (I/O) interface 640, a communication interface 650, and a bus 660 in some embodiments, such as depicted in FIG. 6. Although this disclosure describes and illustrates a particular computer system having a particular number of particular components in a particular arrangement, this disclosure contemplates any suitable computer system having any suitable number of any suitable components in any suitable arrangement.

Processing circuitry 610 includes hardware, software, or both for executing instructions, such as those making up a computer program, in particular embodiments. As an example and not by way of limitation, to execute instructions, processing circuitry 610 may retrieve (or fetch) the instructions from an internal register, an internal cache, memory 620, or storage 630; decode and execute them; and then write one or more results to an internal register, an internal cache, memory 620, or storage 630. In particular embodiments, processing circuitry 610 may include one or more internal caches for data, instructions, or addresses. This disclosure contemplates processing circuitry 610 including any suitable number of any suitable internal caches, where appropriate. As an example and not by way of limitation, processing circuitry 610 may include one or more instruction caches, one or more data caches, and one or more translation lookaside buffers (TLBs). Instructions in the instruction caches may be copies of instructions in memory 620 or storage 630, and the instruction caches may speed up retrieval of those instructions by processing circuitry 610. Data in the data caches may be copies of data in memory 620 or storage 630 for instructions executing at processing circuitry 610 to operate on; the results of previous instructions executed at processing circuitry 610 for access by subsequent instructions executing at processing circuitry 610 or for writing to memory 620 or storage 630; or other suitable data. The data caches may speed up read or write operations by processing circuitry 610. The TLBs may speed up virtual-address translation for processing circuitry 610. In particular embodiments, processing circuitry 610 may include one or more internal registers for data, instructions, or addresses. This disclosure contemplates processing circuitry 610 including any suitable number of any suitable internal registers, where appropriate. Where appropriate, processing circuitry 610 may include one or more arithmetic logic units (ALUs); be a multi-core processor; or include one or more processors. Although this disclosure describes and illustrates certain processing circuitry, this disclosure contemplates any suitable processing circuitry.

Memory 620 may include main memory for storing instructions for processing circuitry 610 to execute or data for processing circuitry 610 to operate on. As an example and not by way of limitation, computer system 600 may load instructions from storage 630 or another source (such as, for example, another computer system 600) to memory 620. Processing circuitry 610 may then load the instructions from memory 620 to an internal register or internal cache. To execute the instructions, processing circuitry 610 may retrieve the instructions from the internal register or internal cache and decode them. During or after execution of the instructions, processing circuitry 610 may write one or more results (which may be intermediate or final results) to the internal register or internal cache. Processing circuitry 610 may then write one or more of those results to memory 620. In particular embodiments, processing circuitry 610 executes only instructions in one or more internal registers or internal caches or in memory 620 (as opposed to storage 630 or elsewhere) and operates only on data in one or more internal registers or internal caches or in memory 620 (as opposed to storage 630 or elsewhere). One or more memory buses (which may each include an address bus and a data bus) may couple processing circuitry 610 to memory 620. Bus 660 may include one or more memory buses, as described below. In particular embodiments, one or more memory management units (MMUs) reside between processing circuitry 610 and memory 620 and facilitate accesses to memory 620 requested by processing circuitry 610. In particular embodiments, memory 620 includes random access memory (RAM). This RAM may be volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 620 may include one or more memories 180, where appropriate. Although this disclosure describes and illustrates particular memory, this disclosure contemplates any suitable memory.

Storage 630 may include mass storage for data or instructions. As an example and not by way of limitation, storage 630 may include a hard disk drive (HDD), a floppy disk drive, flash memory, an optical disc, a magneto-optical disc, magnetic tape, or a Universal Serial Bus (USB) drive or a combination of two or more of these. Storage 630 may include removable or non-removable (or fixed) media, where appropriate. Storage 630 may be internal or external to computer system 600, where appropriate. In particular embodiments, storage 630 is non-volatile, solid-state memory. In particular embodiments, storage 630 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 630 taking any suitable physical form. Storage 630 may include one or more storage control units facilitating communication between processing circuitry 610 and storage 630, where appropriate. Where appropriate, storage 630 may include one or more storages 140. Although this disclosure describes and illustrates particular storage, this disclosure contemplates any suitable storage.

I/O interface 640 may include hardware, software, or both, providing one or more interfaces for communication between computer system 600 and one or more I/O devices. Computer system 600 may include one or more of these I/O devices, where appropriate. In certain embodiments, I/O interface 640 may be referred to as a user interface, for example, if I/O interface 640 interfaces with I/O devices that enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. In certain embodiments, an I/O device may be integrated within a user device 115. For example, the I/O device may be a touch screen integrated in a smart phone, tablet, laptop, or other user device 115. In certain embodiments, an I/O device may be external to user device 115. For example, the I/O device may be a monitor, keyboard, mouse, or other device that connects to the user device 115 via any suitable connection (e.g., wired or wireless connection). Where appropriate, I/O interface 640 may include one or more device or software drivers enabling processing circuitry 610 to drive one or more of these I/O devices. I/O interface 640 may include one or more I/O interfaces 185, where appropriate. This disclosure contemplates any suitable I/O devices and any suitable I/O interfaces 185 for them. Although this disclosure describes and illustrates a particular I/O interface, this disclosure contemplates any suitable I/O interface.

Communication interface 650 may include hardware, software, or both providing one or more interfaces for communication (such as, for example, packet-based communication) between computer system 600 and one or more other computer systems 600 or one or more networks (e.g., network 110). As an example and not by way of limitation, communication interface 650 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 650 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 650 for any of these networks, where appropriate. Communication interface 650 may include one or more communication interfaces 190, where appropriate. Although this disclosure describes and illustrates a particular communication interface, this disclosure contemplates any suitable communication interface.

Bus 660 may include hardware, software, or both coupling components of computer system 600 to each other. As an example and not by way of limitation, bus 660 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 660 may include one or more buses 660, where appropriate. Although this disclosure describes and illustrates a particular bus, this disclosure contemplates any suitable bus or interconnect.

The components of computer system 600 may be integrated or separated. In some embodiments, components of computer system 600 may each be housed within a single chassis. The operations of computer system 600 may be performed by more, fewer, or other components. Additionally, operations of computer system 600 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 8:
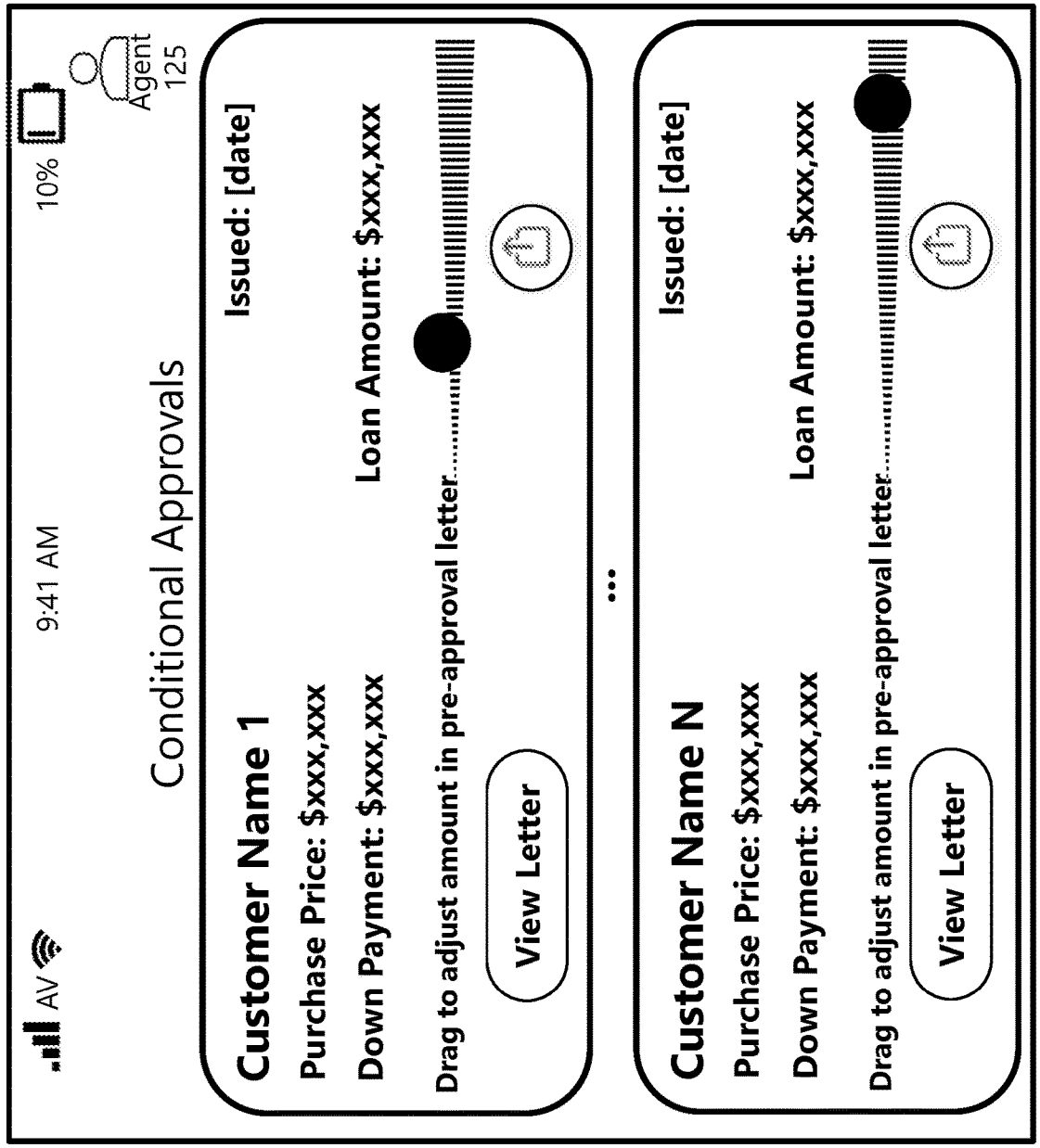
Figure 9:
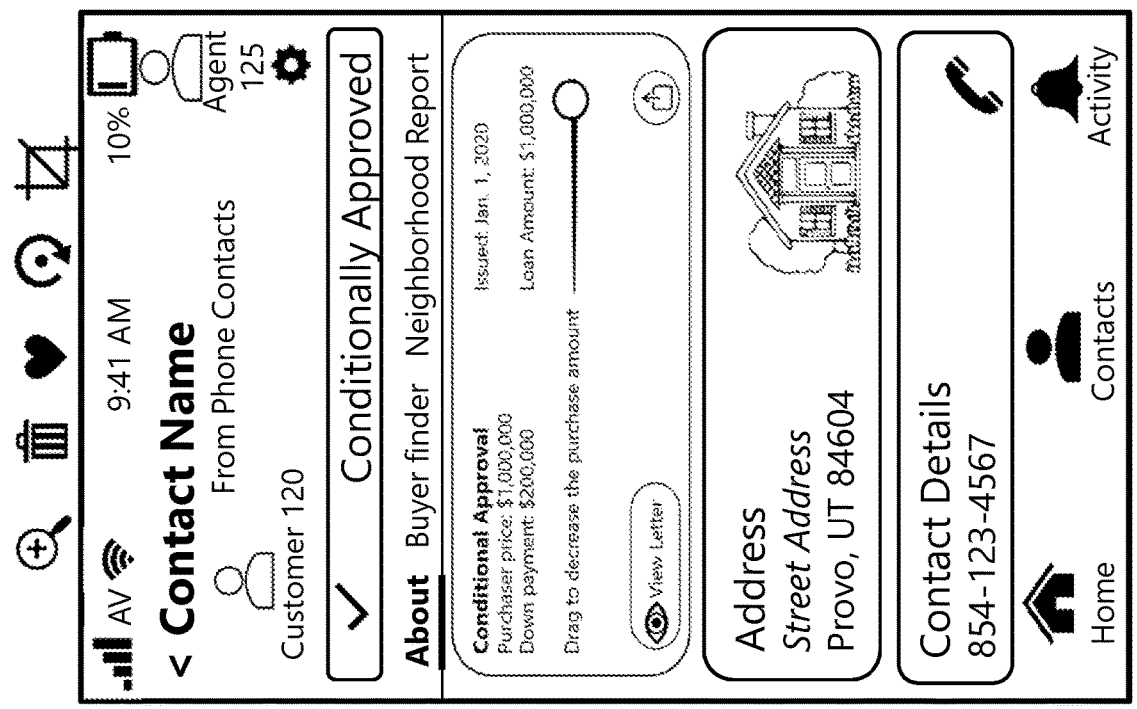

FIGS. 7-9 illustrate examples of graphical user interfaces that may be used to manage pre-approvals, in accordance with certain embodiments.

In certain embodiments, the graphical user interfaces shown in FIGS. 7-9 may be displayed on a user device 115 belonging to an agent 125, such as a realtor or real estate agent representing a home buyer. The graphical user interfaces may be displayed as part of an application that assists agent 125 in representing customer 120. The application may include features that facilitate inviting customer 120 to a loan pre-approval process, making and tracking offers on behalf of customers 120, and/or connecting a customer 120 to a lender 130 to proceed with a formal loan process once an offer has been accepted.

FIG. 7 illustrates a graphical user interface from which agent 125 can access various features of the application. The example in FIG. 7 includes buttons named "My Lenders," "Conditional Approvals," "Associate Addresses," and "Mortgage Calculator." Other embodiments may include more, fewer, and/or different buttons.

The My Lenders button may allow agent 125 to access contact information for agent 125's preferred lenders 130. The example in FIG. 7 shows a number "3" associated with the My Lenders button, which indicates that agent 125 has stored contact information for three lenders 130. In certain embodiments, agent 125 may refer a customer 120 to one of agent 125's preferred lenders 130 when the customer 120 is ready to proceed with a formal loan process.

In certain embodiments, agent 125's preferred lender 130 may extend a loan to a customer 120 that was pre-approved by lending system 135. In certain embodiments, lending system 135 may provide information obtained during the pre-approval phase to agent 125's preferred lender 130. As an example, agent 125 may interact with agent 125's user device 115 to instruct lending system 135 to provide the information to the preferred lender 130. As another example, in certain embodiments where lenders 130 submit quotes to lending system 135 in order to bid on the opportunity to complete a loan with customer 120, lending system 135 may receive information from agent 125 identifying agent 125's preferred lenders 130, and lending system 135 may use this information to ensure that the bids that lending system 135 presents to customer 120 include bids from one or more preferred lenders 130 of customer 120's agent 125. As another example, agent 125 may interact with agent 125's user device 115 to facilitate communication among customer 120, the preferred lender 130, and lending system 135 so that customer 120 can request lending system 135 to provide the information to the preferred lender 130. The information may include information received in the application for pre-approval (e.g., information received by lending system 135 in step 403 of FIG. 4a) and/or information about the products for which customer 120 qualified for pre-approval based on a pre-approval policy (e.g., information determined by lending system 135 in step 404 of FIG. 4a).

The Conditional Approvals button may allow agent 125 to access a set of conditional approvals pending for one or more of agent 125's customers 120. For example, the Conditional Approvals button may allow agent 15 to access the conditional approvals shown in FIG. 8. The example in FIG. 7 shows a number "14" associated with the Conditional Approvals button, which indicates that agent 125 is tracking the status of fourteen conditional approvals.

The Associate Addresses button may allow agent 125 to access contact information for agent 125's associates. As an example, the Associate Addresses button may allow agent 125 to access contact information for agent 125's colleagues, such as other agents 125. Agent 125 and his or her associates may work together to support customers 120. The example in FIG. 7 shows a number "14" associated with the Associate Addresses button, which indicates that agent 125 has stored contact information for fourteen of agent 125's associates.

The Mortgage Calculator button may allow agent 125 to access a mortgage calculator. In certain embodiments, the mortgage calculator may predict a monthly mortgage payment based on factors such as purchase price, down payment amount, and interest rate.

FIG. 7 also includes a list of customers 120 (e.g., customers with Name 1, Name 2, Name 3, and so on). The list provides high level status information associated with each customer 120 in the list. The example in FIG. 7 illustrates that the customer with Name 1 had a "loan application sent" today, the customer with Name 2 had an "application in progress" yesterday, the customer with Name 3 had a loan "conditionally approved" on April 7, the customer with Name 4 had "quotes received" on February 15, and a customer with Name 5 had a "loan funded" on January 28. The list may be sorted in any suitable order, such as alphabetically by customer name, chronologically based on status date, logically based on type of event, or other suitable manner. In certain embodiments, agent 125 may dynamically change the criteria used to sort the list. In certain embodiments, agent 125 may select one of the customers 120 to obtain further information about that customer 120, such as contact information, additional status information, etc. FIG. 9 illustrates an example of information that agent 125 may access by selecting one of the customers 120 in FIG. 7.

FIG. 7 illustrates that the graphical user interface may include a button that allows a contact to be introduced to a lending service. For example, agent 125 may select the "+" sign associated with the "FastTrack" feature in order to identify a contact (customer 120) to be introduced to the lending service. In response to agent 125 adding a contact to the FastTrack, lending system 135 may send the contact an invitation to submit a pre-approval application form. As an example, lending system 135 sends contact/customer 120 a text or email message that takes customer 120 to a website where the customer 120 fills out a digital mortgage application.

FIG. 8 illustrates an example of a graphical user interface from which agent 125 can access a plurality of conditional approvals. Each conditional approval may be similar to that described above with respect to FIG. 5. The example in FIG. 8 may allow agent 125 to manage one or more conditional approvals each for one or more customers 120. In particular, the example in FIG. 8 includes a conditional approval for a first customer with Name 1 and an Nth customer with Name N. Agent 125 may interact with the graphical user interface shown in FIG. 8 in order to dynamically generate pre-approval letters for any of the conditional approvals listed in FIG. 8.

FIG. 9 illustrates an example of a graphical user interface from which agent 125 can access detailed information associated with a particular contact, such as a particular customer 120 named "Contact Name" in the example of FIG. 9. In certain embodiments, the detailed information associated with a contact may include contact information, such as a phone number or address of customer 120. In certain embodiments, the detailed information associated with a contact may indicate whether the contact has been conditionally approved (pre-approved) for a loan. If the contact has been conditionally approved for a loan, the conditional approval described with respect to FIG. 5 may be included in the graphical user interface of FIG. 9. Agent 125 may interact with the graphical user interface shown in FIG. 9 in order to dynamically generate pre-approval letters for the particular customer 120.

In certain embodiments, lending system 135 manages content displayed on agent 125's user device 115. As one example, agent 125 connects to lending system 135 via user device 115 and lending system 135 mines contacts and stores the contacts. Lending system 135 may use the contacts to generate at least a portion of the content of a graphical user interface for display by agent 125's user device 115. In certain embodiments, lending system 135 stores information (such as agent 125's contacts) in a cloud-hosted environment. For example, information may be stored in a relational database hosted in a cloud. Contacts may be earmarked per agent 125 such that they are not shared with other agents 125 accessing lending system 135.

FIG. 10 illustrates an example graphical user interface in which agent 125 submits information about a customer 120 being invited to join the lending platform. The information may include customer 120's name (e.g., first name and last name), contact information (e.g., email address and phone number), and other suitable information, such as customer 120's organization (e.g., an organization where customer 120 is employed) and customer 120's role within the organization. Agent 125 may select to "send invitation" to initiate the process. In certain embodiments, selecting "send invitation" causes agent 125's device 115 to send the messages described in step 201 (referral) and/or step 202 (invitation) of FIG. 2. FIG. 11 illustrates an example of an invitation sent to customer 120's user device 115 as a result of agent 125 initiating the invitation process.

FIG. 11 illustrates an example graphical user interface that invites customer 120 to create an account associated with a lending platform, in accordance with certain embodiments. For example, customer 120 may receive an email or text message containing a web address or link for accessing a website where customer 120 can create an account.

In certain embodiments, the web address or link may be unique to a particular customer 120. For example, agent 125 may provide lending system 135 with a referral that includes basic customer information, such as the customer's name, contact information (e.g., email address and/or phone number), organization, and/or role. Lending system 135 may create an account for customer 120 and may start populating a profile for customer 125 using the information provided by agent 125. The web address or link sent in the invitation to the customer 120 may be associated with the account. Thus, when customer 120 navigates to the web address or activates the link, lending system 135 may retrieve the associated customer information to facilitate creating the account for customer 120. Lending system 135 may then send information to customer 120's user device 115 that causes user device 115 to display a screen where customer 120 completes registration of the account (e.g., by creating a password, completing the profile for customer 120, and/or accepting terms and conditions of the account). In certain embodiments, after creating the account, customer 120 may be prompted to download a software application for further interacting with lending system 135.

In certain embodiments, the invitation of FIG. 11 may be sent from lending system 135 to customer 120. In other embodiments, the invitation of FIG. 11 may be sent from agent 125 to customer 120. Agent 125 may inform lending system 135 of the web address or link sent in agent 125's invitation to customer 120 (or lending system 135 may provide agent 125 with the web address or link to be sent in agent 125's invitation to customer 120). In this manner, lending system 135 can associate the web address or link in agent 125's invitation to customer 120 with an account that lending system 135 has created for customer 120.

FIGS. 12-14 illustrate examples of screen captures from a graphical user interface that may be used by a customer 120 to manage loan applications, in accordance with certain embodiments. For example, FIG. 12 illustrates an example of a process that customer 120 may follow to begin an application for a loan. As an example, the process may include interacting with user device 115, via the graphical user interface, to provide information about customer 120's assets, information about customer 120's employment and income, and a declaration from customer 120. If customer 120 plans to have a co-borrower on the loan, such as customer 120's spouse, customer 120 or the co-borrower may provide information about the co-borrower's assets, employment, and income, as well as a declaration from the co-borrower. In certain embodiments, some or all of the information may be provided as part of a pre-approval process, such as the pre-approval process described above with respect to FIG. 3 and/or FIGS. 4*a*-4*b*.

FIG. 12 illustrates examples of an interface that allows customer 120 to provide information about his or her assets. For example, customer 120 may provide information about financial accounts or real estate owned by customer 120. In the example shown in FIG. 12, customer 120 may click on an account type to add that type of account. Examples of account types include checking account, savings account, mutual fund, retirement account, and other (an account type that can be added manually by customer 120). Similarly, customer 120 may click on "add real estate" to provide information about real estate owned by customer 120. Customer 120 may click on "does not own any real estate" if customer 120 does not own any real estate. If customer 120 plans to have a co-borrower, customer 120 or the co-borrower may provide similar information for the co-borrower.

FIG. 13 illustrates an example of an interface that allows customer 120 to review and edit the information about customer 120's assets. The example shown in FIG. 13 illustrates a total value of assets disclosed by customer 120, a list of the assets with an option to edit the information associated with any of the assets, and an option to add additional assets.

FIG. 14 illustrates an example of an interface that allows customer 120 to review and edit information about customer 120's income. For example, customer 120 may select "add income" to add another income source. Customer 120 may add information about active income, such as customer 120's employer and salary, and/or passive income, such as income customer 120 receives as the owner of a rental property. If customer 120 plans to have a co-borrower, customer 120 or the co-borrower may provide income information for the co-borrower. FIG. 14 illustrates an example in which income information has been provided for both customer 120 (Your Active Income and Your Passive Income) and customer 120's co-borrower (John's Active Income, John's Passive Income).

FIG. 14 also illustrates an example of an interface that allows customer 120 to review and edit a declaration form. In certain embodiments, the declaration may include customer 120's and any co-borrower's acknowledgement that the information provided is true and correct and that customer 120 and any co-borrower have authorized the loan application. In certain embodiments, the declaration may include questions relevant to applying for a loan. Examples of questions may include questions about customer 120's finances, such as whether customer 120 has experienced any bankruptcy, foreclosure, or delinquency or default on a debt during a recent time period, whether customer 120 has any ongoing financial obligations, etc.

Customer 120 may select "Submit Application" to proceed with the loan application process. Selecting "Submit Application" may cause the application to be submitted to lending system 135, for example, as described in step 301 of FIG. 3 or step 403 of FIG. 4*a*. That is, customer 120 may submit the application in order to obtain a pre-approval. In the event that customer 120 submits the application prior to completing fields necessary to assess the pre-approval, financial manager 130 may contact customer 120 and may assist customer 120 with providing the necessary information. When customer 120 is ready to proceed with obtaining a loan (e.g., when the seller has accepted customer 120's offer), the application may also be used as a starting point for completing the loan process. Lender 130 may request customer 120 to supplement the information or documents in the application as needed to approve the loan.

Example Embodiments

Embodiment 1. A user device, the user device comprising:
a communication interface, the communication interface configured to receive pre-approval information from a server, the pre-approval information indicating a maximum pre-approval amount for which a customer has qualified based on a pre-approval policy of a lender;
processing circuitry, the processing circuitry configured to generate a graphical user interface based on the pre-approval information, wherein the graphical user interface comprises an adjustable pre-approval field that enables a user to select up to the maximum pre-approval amount to include in a pre-approval letter; and
an input/output (I/O) interface, the I/O interface configured to:
display the graphical user interface to the user; and
receive an input associated with the adjustable pre-approval field, the input indicating an adjusted pre-approval amount selected by the user;
wherein the processing circuitry is further configured to generate a pre-approval letter based on the adjusted pre-approval amount, the pre-approval letter comprising a signature of the lender, the pre-approval letter generated without sending the adjusted pre-approval amount to the lender.

Embodiment 2. The user device of example embodiment 1, wherein the communication interface is further configured to communicate instructions to the customer, the instructions comprising a link for initiating an application for pre-approval with the server.

Embodiment 3. The user device of example embodiment 1, wherein the processing circuitry is further configured to perform at least one of the following: store the pre-approval letter; instruct the communication interface to communicate the pre-approval letter to an electronic address associated with another party (e.g., communicate the pre-approval letter to an email address, IP address, or other electronic address associated with the customer, the customer's agent, the lender, the seller, or the seller's agent); instruct the I/O interface to display the pre-approval letter to the user; or instruct the I/O interface to print the pre-approval letter.

Embodiment 4. The user device of example embodiment 1, wherein:
the I/O interface is further configured to:
receive a second input associated with the adjustable pre-approval field, the second input indicating a second adjusted pre-approval amount selected by the user; and
the processing circuitry is further configured to:
generate a second pre-approval letter based on the second adjusted pre-approval amount, the second pre-approval letter comprising a signature of the lender, the second pre-approval letter generated without sending the second adjusted pre-approval amount to the lender.

Embodiment 5. The user device of example embodiment 4, wherein the processing circuitry is further configured to:
store both the pre-approval letter and the second pre-approval letter in memory;
perform a determination whether to retrieve the pre-approval letter or the second pre-approval letter from memory, a result of the determination depending on a request from the user; and
retrieve the pre-approval letter or the second pre-approval letter from memory based on the result of the determination.

Embodiment 6. The user device of example embodiment 1, wherein the processing circuitry is further operable to facilitate initiating a loan process between the customer and the lender.

Embodiment 7. A method, the method comprising:
receiving pre-approval information from a server, the pre-approval information indicating a maximum pre-approval amount for which a customer has qualified based on a pre-approval policy of a lender;
generating a graphical user interface based on the pre-approval information, wherein the graphical user interface comprises an adjustable pre-approval field that enables a user to select up to the maximum pre-approval amount to include in a pre-approval letter;
displaying the graphical user interface to the user;
receiving an input associated with the adjustable pre-approval field, the input indicating an adjusted pre-approval amount selected by the user; and
generating a pre-approval letter based on the adjusted pre-approval amount, the pre-approval letter comprising a signature of the lender, the pre-approval letter generated without sending the adjusted pre-approval amount to the lender.

Embodiment 8. A non-transitory computer readable medium comprising logic that, when executed by processing circuitry of a user device, causes the user device to perform actions comprising:
receiving pre-approval information from a server, the pre-approval information indicating a maximum pre-approval amount for which a customer has qualified based on a pre-approval policy of a lender;
generating a graphical user interface based on the pre-approval information, wherein the graphical user interface comprises an adjustable pre-approval field that enables a user to select up to the maximum pre-approval amount to include in a pre-approval letter;
displaying the graphical user interface to the user;
receiving an input associated with the adjustable pre-approval field, the input indicating an adjusted pre-approval amount selected by the user; and
generating a pre-approval letter based on the adjusted pre-approval amount, the pre-approval letter comprising a signature of the lender, the pre-approval letter generated without sending the adjusted pre-approval amount to the lender.

Figure 15:
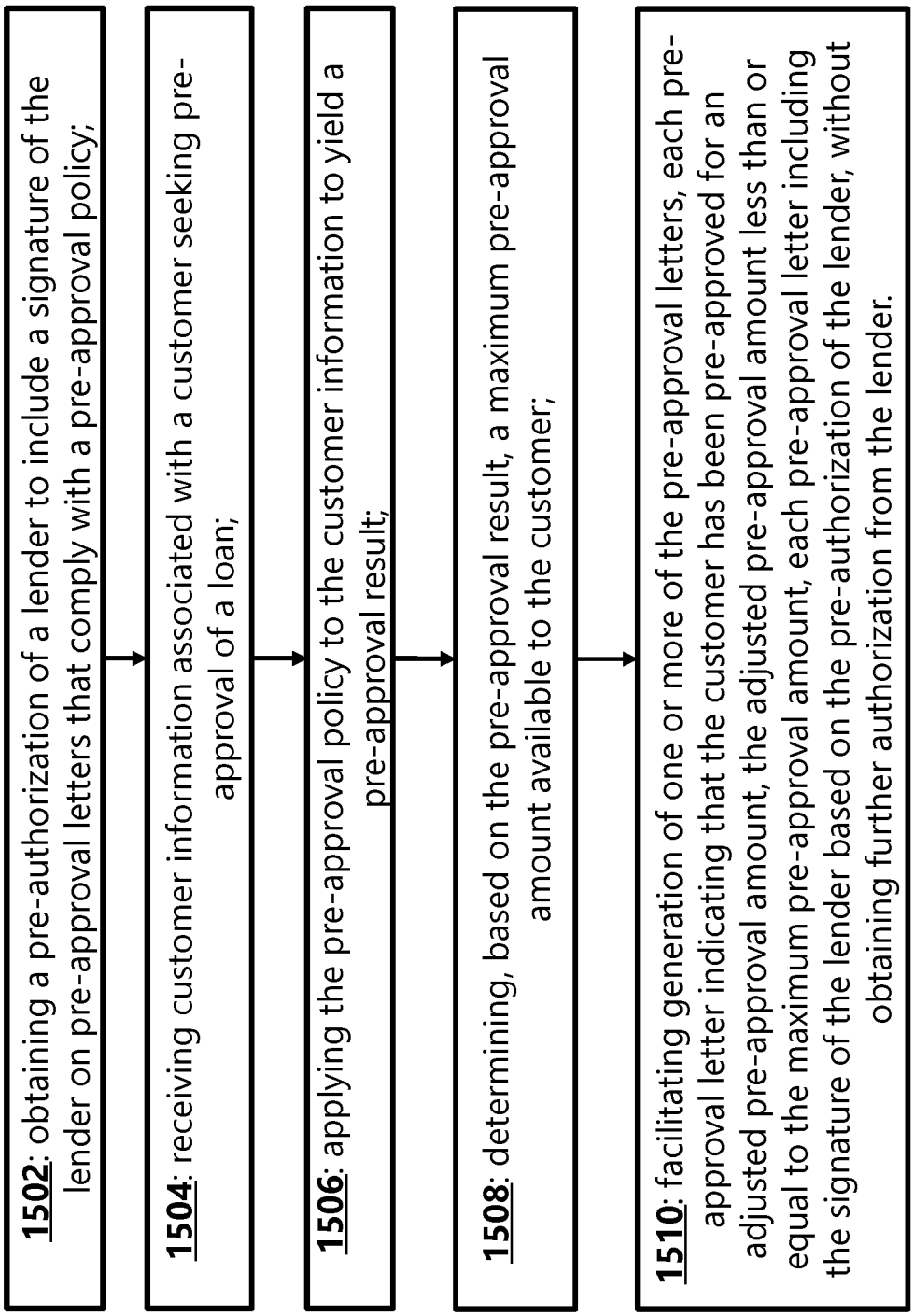
FIG. 15 illustrates an example of a method that may be performed by a lending system, in accordance with some embodiments.

FIG. 15 illustrates an example of a method 1500 that may be performed by a lending system, such as lending system 135, in accordance with certain embodiments. For example, lending system 135 may comprise a communication interface (e.g., communication interface 650) and processing circuitry (e.g., processing circuitry 610) configured to perform the steps of method 1500. In certain embodiments, a non-transitory computer readable medium comprises logic that, when executed by processing circuitry of a lending system 135, causes lending system 135 to perform actions comprising the steps of method 1500.

Method 1500 begins at step 1502 with obtaining a pre-authorization of a lender 130 to include a signature of the lender on pre-approval letters that comply with a pre-approval policy. In certain embodiments, the pre-authorization is received from a user device 115 associated with lender 130, e.g., via a communication interface. Depending on the embodiment, lender 130 may either expressly provide pre-authorization (e.g., by approving the pre-approval policy) or implicitly provide pre-authorization (e.g., by registering to participate in a loan platform, such as Intro-Lend™).

At step 1504, method 1500 receives customer information associated with a customer 120 that is seeking pre-approval of a loan. Customer information may be obtained from customer 120, customer's agent 125, or a third party, such as a credit bureau. As an example, customer information may include one or more credit reports associated with customer 120 and obtained from a credit bureau. As another example, customer information may include information obtained from the customer via a web portal configured to manage a pre-approval application of the customer. For example, the web portal may be configured to collect information such as that shown in FIGS. 12-14. Further examples of customer information that may be collected in a pre-approval application are discussed above with respect to FIGS. 1, 3 (e.g., steps 301-304), and 4a (e.g., steps 402-403).

At step 1506, method 1500 applies the pre-approval policy to the customer information to yield a pre-approval result. Applying the pre-approval policy occurs sometime after obtaining the pre-authorization of lender 130. This ensures that lender 130's signature is authorized/available to be included on pre-approval letters that comply with the pre-approval policy (without requiring further involvement of lender 130 to generate the pre-approval letters). Examples of applying a pre-approval policy are described in FIG. 3 (e.g., step 305) and FIG. 4a (e.g., step 404).

At step 1508, method 1500 determines uses the pre-approval result from step 1506 to determine a maximum pre-approval amount available to the customer. As an example, the pre-approval result may comprise a set of loan products for which the customer has qualified for pre-approval. Each loan product is associated with a respective pre-approval amount (such as $900,000, $950,000, or $1,000,000 depending on whether the loan product is fixed-rate or ARM, the number of years to repay the loan, etc.). As examples, see FIG. 3 (e.g., step 306) and FIG. 4a (e.g., step 405). The method may compare the respective pre-approval amounts of the set of loan products and select a highest pre-approval amount as the maximum pre-approval amount (in the example, $1,000,000).

At step 1510, method 1500 facilitates generating one or more of the pre-approval letters. Each pre-approval letter indicates that customer 120 has been pre-approved for an adjusted pre-approval amount. The adjusted pre-approval amount is less than or equal to the maximum pre-approval amount determined in step 1508. Each pre-approval letter includes the signature of lender 130 based on the pre-authorization of lender 130 obtained in step 1502 (without obtaining further authorization from lender 130). For example, method 1600 need not send the adjusted pre-approval amount to lender 130. That is, because lender 130 previously approved lending system 135 to apply the pre-approval policy, lender 130's signature may automatically be signed to a pre-approval letter for an amount less than or equal to the maximum amount obtained by applying the approved pre-approval policy without requiring any back-and-forth with the lender 130. Examples of generating the pre-approval letter are provided with respect to FIG. 3 (e.g., step 307), FIG. 4a (e.g., step 407), and FIG. 4b (e.g., step 408). In order to manage the use of lender 130's signature, the pre-approval letter is generated in electronic form (e.g., the pre-approval letter can be a PDF document). After the pre-approval letter has been generated in electronic form, a copy can be printed in paper form.

In certain embodiments, method 1500 facilitates generating the one or more pre-approval letters of step 1510 by communicating the maximum pre-approval amount to a user device 115 associated with the customer or an agent of the customer. In certain embodiments, communicating the maximum pre-approval amount indicates to user device 115 that user device 115 has been authorized to obtain input from customer 120 or customer 120's agent 125 indicating the respective adjusted pre-approval amount for each pre-approval letter (e.g., $700,000 for the first letter and $750,000 for the second letter) and then to generate the one or more pre-approval letters that include (1) the signature of the lender, and (2) an indication that the customer has been pre-approved for the adjusted pre-approval amount. The indication that user device 115 has been authorized to generate the one or more pre-approval letters may be implicit (e.g., based on receiving the maximum pre-approval amount, the user device 115 may automatically proceed with the steps of obtaining an adjusted pre-approval amount from the user and generating the corresponding pre-approval later).

As discussed above, the adjusted pre-approval amount in the pre-approval letter must be less than or equal to the maximum pre-approval amount determined in step 1508. Thus, user device 115 may be configured to prevent the adjusted pre-approval amount from exceeding the maximum pre-approval amount. As an example, in certain embodiments, lending system 135 may send agent 125a a pre-approval letter as an electronic form that includes lender 130's signature and an editable pre-approval amount. The editable pre-approval amount may be set to the maximum pre-approval amount by default, for example, and may enable an application running on user device 115 to adjust the amount downward and locally generate a pre-approval letter with the adjusted pre-approval amount less than or equal to the maximum pre-approval amount (e.g., the electronic form may be configured to prevent the application running on user device 115 from generating a pre-approval letter with a pre-approval amount above the maximum pre-approval amount).

In certain embodiments, method 1500 facilitates generating the one or more pre-approval letters of step 1510 by communicating the maximum pre-approval amount to a user device 115 associated with customer 120 or an agent 125 of customer 120. In response to communicating the maximum pre-approval amount to user device 115, method 1500 receives each adjusted pre-approval amount from user device 115. Method 1500 may include verifying that the adjusted pre-approval amount received from user device 115 is less than the maximum pre-approval amount. Method 1500 then generates the one or more pre-approval letters (the letters that include the signature of the lender and that indicate that the customer has been pre-approved for the respective adjusted pre-approval amount) and communicate the one or more pre-approval letters to user device 115.

In certain embodiments, method 1500 may include additional steps, such as any of the steps described as being performed by lending system 135 with respect to FIGS. 1, 2, 3, 4a, and/or 4b. As an example, in certain embodiments, method 1500 further comprises receiving a referral from agent 125 (the referral refers customer 120 to lending system 135), creating an account for customer 120 in response to receiving the referral, and communicating an invitation to customer 120 (the invitation includes a web address or link that enables the customer to complete registration of the account). See e.g., FIG. 2 (steps 201-202), FIG. 10, and FIG. 11. As another example, in certain embodiments, method 1500 further comprises receiving an indication that customer 120 has opted to proceed with a loan process and facilitating connecting customer 120 with lender 130 or another lender 130 (e.g., another lender 130 associated with lending system 135). For example, the method may provide customer 120 with bids from various lenders 130, the method may provide lender 130 with customer 120's customer information (e.g., customer information that was received in step 1504 may be forwarded to lender 130), the method may provide lender 130 with information for contacting customer 120, and/or the method may provide customer 120 with information for contacting lender 130. See FIG. 4b (e.g., steps 415-417) for further examples.

Certain examples have described lending system 135 sending information to or receiving information from various user devices 115 (e.g., user devices 115 associated with customer 120, agent 125, lender 130, and/or financial manager 140) via a communication interface. Lending system 135 may communicate with user devices 115 via the communication interface in any suitable manner. As one example, lending system 135 may communicate information to/from an account associated with a user of user device 115, and the user may interact with user device 115 in order to login to the account and retrieve or submit information (e.g., via a web page or web portal). As another example, lending system 135 may obtain an IP address, a phone number, or other identifier of user device 115 in order to communicate with user device 115.

Figure 16:
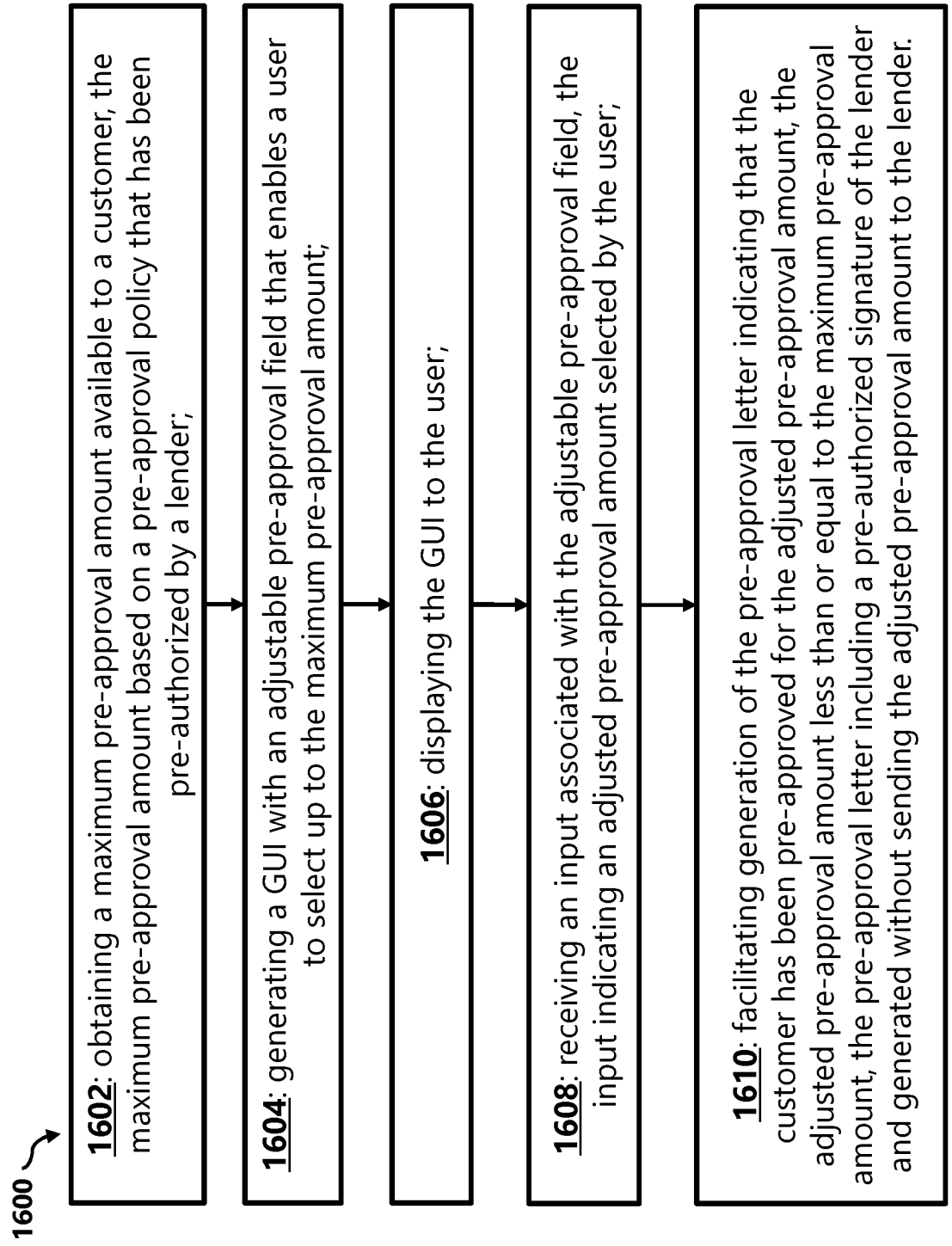
FIG. 16 illustrates an example of a method that may be performed by a user device, in accordance with some embodiments.

FIG. 16 illustrates an example of a method 1600 that may be performed by a user device, such as user device 115, in accordance with certain embodiments. User device 115 may be associated with a customer 120 or an agent 125, depending on the embodiment. In certain embodiments, user device 115 may comprise one or more interfaces (e.g., I/O interface 640, communication interface 650) and processing circuitry (e.g., processing circuitry 610) configured to perform the steps of method 1600. In certain embodiments, a non-transitory computer readable medium comprises logic that, when executed by processing circuitry of a user device 115, causes user device 115 to perform actions comprising the steps of method 1600.

At step 1602, method 1600 obtains a maximum pre-approval amount available to a customer 120. For example, the maximum pre-approval amount may be received, via a communication interface, from a lending system 135 that has determined the maximum pre-approval amount based on applying a pre-approval policy that has been approved/pre-authorized by lender 130. Alternatively, certain embodiments may obtain the maximum pre-approval amount by applying the pre-approval policy (i.e., the pre-approval policy approved/pre-authorized by lender 130) at user device 115.

Method 1600 may then generate a graphical user interface comprising an adjustable pre-approval field (step 1604) and display the graphical user interface via the I/O interface (step 1606). The adjustable pre-approval field enables a user to select up to the maximum pre-approval amount to include in a pre-approval letter. Examples of the graphical user interface comprising the adjustable pre-approval field are shown in FIGS. 5, 8, and 9. FIG. 5 identifies the adjustable pre-approval field as reference numeral 500.

At step 1608, method 1600 receives an input associated with the adjustable pre-approval field via the I/O interface. The input indicates an adjusted pre-approval amount selected by the user. As an example, the user may interact with adjustable pre-approval field 500 in FIG. 5 by dragging the indicator from the maximum pre-approval amount (e.g., $1,000,000) to an adjusted pre-approval amount (e.g., $750,000) and selecting an action (e.g., "View Letter") to indicate that the user has completed the adjustment and wishes to proceed with generating the pre-approval letter. Any suitable I/O interface may be used to receive input from the user (e.g., touchscreen, mouse click, stylus, etc.).

At step 1610, method 1600 facilitates generating the pre-approval letter. The pre-approval letter indicates that the customer has been pre-approved for the adjusted pre-approval amount. The pre-approval letter includes a pre-authorized signature of a lender 130. For example, lender 130's signature may be considered "pre-authorized" because lender 130 previously approved/authorized including lender 130's signature on pre-approval letters that comply with a pre-approval policy, the maximum pre-approval amount is based on/complies with the pre-approval policy, and the adjusted pre-approval amount is less than or equal to the maximum pre-approval amount. Thus, lender 130's signature can be applied to the pre-approval letter without sending the adjusted pre-approval amount to the lender or without otherwise seeking further authorization from lender 130. In order to manage the use and security of lender 130's signature, the pre-approval letter is generated in electronic form (e.g., the pre-approval letter can be a PDF document). After the pre-approval letter has been generated in electronic form, a copy can be printed in paper form.

In certain embodiments, to facilitate generation of the pre-approval letter in step 1610, the method causes the pre-approval letter to be generated at the user device itself. As an example, the method may obtain a form or template stored in memory of the user device and may populate one or more fields, including the adjusted pre-approval amount, in order to generate the pre-approval letter. In certain embodiments, the form or template may have been previously received from lending system 135. For example, lending system 135 may have provided the form or template in step 1602, and lending system 135 may have included lender 130's pre-authorized signature in the form or template along with a security configuration that prevents lender 130's pre-authorized signature from being used in an unauthorized manner (e.g., the security configuration can prevent user device 115 from generating pre-approval letters for amounts that exceed the maximum pre-approval amount).

In certain embodiments, to facilitate generation of the pre-approval letter in step 1610, the method comprises communicating the adjusted pre-approval amount to lending system 135 via the communication interface and, in response, receiving the pre-approval letter comprising the adjusted pre-approval amount from lending system 135 via the communication interface.

Once the pre-approval letter has been generated, the method may handle the pre-approval letter in any suitable manner (e.g., store the pre-approval letter for later use, send the pre-approval letter to another party/another device, display the pre-approval letter on a display screen of the user device, print the pre-approval letter, etc.). Examples of sending the pre-approval letter to another party may include sending to an email address, IP address, or other electronic address associated with customer 120, customer 120's agent 125, lender 130, financial manager 140, the seller, or the seller's agent.

Steps 1608 and 1610 can be repeated any suitable number of times. For example, method 1600 may further comprise receiving, via the I/O interface, a second input associated with the adjustable pre-approval field. The second input indicates a second adjusted pre-approval amount selected by the user. The method then facilitates generating a second pre-approval letter indicating that the customer has been pre-approved for the second adjusted pre-approval amount. The second adjusted pre-approval amount is less than or equal to the maximum pre-approval amount. The second pre-approval letter includes the pre-authorized signature of the lender and is generated without sending the second adjusted pre-approval amount to the lender (or without otherwise seeking further authorization from lender 130). In this manner, customer 120 would be able to present a first offer with a first pre-approval letter (in the amount of, e.g., $700,000) and a second offer with a second pre-approval letter (in the amount of, e.g., $750,000).

In certain embodiments, method 1600 further comprises storing both the pre-approval letter and the second pre-approval letter in memory, receiving a request from the user (the request indicates to retrieve either the pre-approval letter or the second pre-approval letter), and retrieving either the pre-approval letter or the second pre-approval letter from memory based on the request. In certain embodiments, the request may include an action to perform on the retrieved pre-approval letter (e.g., display on the user device, send to another party, print, delete, etc.).

As noted above, method 1600 may be performed by a user device 115 of customer 120 or a user device 115 of customer 120's agent 125, depending on the embodiment. In embodiments, where user device is associated with agent 125 representing customer 120, the method may further comprise communicating a referral to lending system 135. As discussed with respect to FIG. 2, the referral initiates a process of registering customer 120 with lending system 135. Lending system 135 may then obtain customer information from customer 120 and use the customer information to determine the maximum pre-approval amount received by user device 115 in step 1602.

Method 1600 may include additional steps, such as any of the steps described as being performed by customer 120's or agent 125's user device with respect to FIGS. 1, 2, 3, 4*a*, and/or 4*b*.

Although certain examples throughout the disclosure have been described in the context of an agent 125 dynamically generating a pre-approval letter, in other embodiments, other types of users of a user device 115 dynamically generate a pre-approval. As an example, in certain embodiments, a customer 120 or a lender 130 may interact with a user device 115 to dynamically generate a pre-approval letter. The customer 120 or lender 130 may send the pre-approval letter to agent 125 so that agent 125 can include the pre-approval letter when making offers on behalf of customer 120.

Although certain examples throughout this disclosure have been described in the context of a graphical user interface, other embodiments may use other types of user interfaces. For example, certain embodiments may use an audio implementation in which user device 115 communicates a maximum pre-approval amount to a user via a speaker, and the user communicates an adjusted pre-approval amount to user device 115 via a microphone. User device 115 then uses the adjusted pre-approval amount received via the microphone when generating a pre-approval letter.

Modifications, additions, or omissions may be made the systems described herein. The components may be integrated or separated. Moreover, the operations of a system may be performed by more, fewer, or other components. Additionally, the operations of a system may be performed using any suitable logic. As used in this document, "each" refers to each member of a set or each member of a subset of a set.

Modifications, additions, or omissions may be made to the methods described herein. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure.

The invention claimed is:

1. A user device, the user device comprising:
a communication interface;
an input/output (I/O) interface; and
processing circuitry, the processing circuitry configured to:
  obtain a maximum pre-approval amount available to a customer, the maximum pre-approval amount based on a pre-approval policy that has been pre-authorized by a lender;
  generate a graphical user interface comprising an interactive pre-approval field indicating a range of permissible pre-approval amounts equal to or less than the maximum pre-approval amount;
  present the graphical user interface via the I/O interface;
  receive an input associated with the interactive pre-approval field via the I/O interface, the input indicating a requested pre-approval amount from the range of permissible pre-approval amounts;
  generate a pre-approval letter indicating that the customer has been pre-approved for the requested pre-approval amount in response to receiving the input, the pre-approval letter including a pre-authorized signature of the lender and being generated without sending the requested pre-approval amount to the lender;
  store both the pre-approval letter and a second pre-approval letter in memory;
  receive a request from a user, the request requesting to retrieve either the pre-approval letter or the second pre-approval letter; and
  retrieve either the pre-approval letter or the second pre-approval letter from memory based on the request.

2. The user device of claim 1, wherein to generate the pre-approval letter, the processing circuitry is configured to generate the pre-approval letter at the user device.

3. The user device of claim 1, wherein to generate the pre-approval letter, the processing circuitry is further configured to:
communicate the requested pre-approval amount to the lending system via the communication interface and, in response, receive the pre-approval letter comprising the requested pre-approval amount from the lending system via the communication interface.

4. The user device of claim 1, wherein the processing circuitry is further configured to perform at least one of the following:
store the pre-approval letter;
instruct the communication interface to communicate the pre-approval letter to a second user device, the second user device associated with another party;

instruct the I/O interface to display the pre-approval letter to a user; or instruct the I/O interface to print the pre-approval letter.

5. The user device of claim 1, wherein the processing circuitry is further configured to:

receive, via the I/O interface, a second input associated with the interactive pre-approval field, the second input indicating a second requested pre-approval amount selected by a user; and generate a second pre-approval letter indicating that the customer has been pre-approved for the second requested pre-approval amount, the second requested pre-approval amount from the range of permissible pre-approval amounts, the second pre-approval letter including the pre-authorized signature of the lender and being generated without sending the second requested pre-approval amount to the lender.

6. The user device of claim 1, wherein the user device is associated with an agent representing the customer and the processing circuitry is further configured to communicate a referral to the lending system, wherein the referral initiates a process of registering the customer with the lending system.

7. A non-transitory computer readable medium comprising logic that, when executed by processing circuitry of a user device, causes the user device to perform actions comprising:

obtaining a maximum pre-approval amount available to a customer, the maximum pre-approval amount based on a pre-approval policy that has been pre-authorized by a lender;

generating a graphical user interface comprising an interactive pre-approval field indicating a range of permissible pre-approval amounts equal to or less than the maximum pre-approval amount;

presenting the graphical user interface;

receiving an input associated with the interactive pre-approval field, the input indicating a requested pre-approval amount from the range of permissible pre-approval amounts;

generating a pre-approval letter indicating that the customer has been pre-approved for the requested pre-approval amount in response to receiving the input, the pre-approval letter including a pre-authorized signature of the lender and being generated without sending the requested pre-approval amount to the lender storing both the pre-approval letter and a second pre-approval letter in memory;

receiving a request from a user, the request requesting to retrieve either the pre-approval letter or the second pre-approval letter; and retrieving either the pre-approval letter or the second pre-approval letter from memory based on the request.

8. The non-transitory computer readable medium of claim 7, wherein generating the pre-approval letter comprises causing the user device to generate the pre-approval letter itself.

9. The non-transitory computer readable medium of claim 7, wherein generating the pre-approval letter comprises communicating the requested pre-approval amount to a lending system from which the maximum pre-approval amount was obtained and, in response, receiving the pre-approval letter comprising the requested pre-approval amount from the lending system.

10. The non-transitory computer readable medium of claim 7, wherein the logic, when executed by processing circuitry of the user device, further causes the user device to perform actions comprising at least one of the following:

storing the pre-approval letter;

instructing a communication interface to communicate the pre-approval letter to a second user device, the second user device associated with another party;

instructing the I/O interface to display the pre-approval letter to a user; or instructing the I/O interface to print the pre-approval letter.

11. The non-transitory computer readable medium of claim 7, wherein the logic, when executed by processing circuitry of the user device, further causes the user device to perform actions comprising:

receiving, via the I/O interface, a second input associated with the interactive pre-approval field, the second input indicating a second requested pre-approval amount selected by a user; and generating a second pre-approval letter indicating that the customer has been pre-approved for the second requested pre-approval amount, the second requested pre-approval amount from the range of permissible pre-approval amounts, the second pre-approval letter including the pre-authorized signature of the lender and being generated without sending the second requested pre-approval amount to the lender.

12. A lending system, the lending system comprising:

a communication interface; and processing circuitry, the processing circuitry configured to:

obtain a pre-authorization of a lender to include a signature of the lender on pre-approval letters that comply with a pre-approval policy;

receive customer information via the communication interface, the customer information associated with a customer seeking pre-approval of a loan;

apply the pre-approval policy to the customer information to yield a pre-approval result, wherein applying the pre-approval policy occurs sometime after obtaining the pre-authorization of the lender;

determine, based on the pre-approval result, a maximum pre-approval amount available to the customer; and facilitate generating a graphical user interface comprising an interactive pre-approval field indicating a range of permissible pre-approval amounts equal to or less than the maximum pre-approval amount;

facilitate generating one or more of the pre-approval letters, each pre-approval letter indicating that the customer has been pre-approved for a requested pre-approval amount, wherein:

the requested pre-approval amount is selected from the range of permissible pre-approval amounts via the interactive pre-approval field of the graphical user interface;

each pre-approval letter includes the signature of the lender based on the pre-authorization of the lender, without obtaining further authorization from the lender; and the one or more of the pre-approval letters comprises a first pre-approval letter and a second pre-approval letter;

store both the first pre-approval letter and the second pre-approval letter in memory;

receive a request from a user, the request requesting to retrieve either the first pre-approval letter or the second pre-approval letter; and retrieve either the first pre-approval letter or the second pre-approval letter from memory based on the request.

13. The lending system of claim 12, wherein to facilitate generating the one or more pre-approval letters, the processing circuitry is further configured to:
communicate the maximum pre-approval amount to a user device associated with the customer or an agent of the customer via the communication interface, wherein communicating the maximum pre-approval amount indicates to the user device that the user device has been authorized to obtain each requested pre-approval amount from the customer or agent of the customer and to generate the one or more pre-approval letters that include the signature of the lender and that indicate that the customer has been pre-approved for the requested pre-approval amount.

14. The lending system of claim 12, wherein to facilitate generating the one or more pre-approval letters, the processing circuitry is further configured to:
communicate the maximum pre-approval amount to a user device associated with the customer or an agent of the customer via the communication interface;
in response to communicating the maximum pre-approval amount to the user device, receive each requested pre-approval amount from the user device;
generate the one or more pre-approval letters that include the signature of the lender and that indicate that the customer has been pre-approved for the respective requested pre-approval amount; and
communicate the one or more pre-approval letters to the user device via the communication interface.

15. The lending system of claim 12, wherein the customer information comprises:
at least one credit report associated with the customer, the credit report obtained from a credit bureau; and
information obtained from the customer via a web portal configured to manage a pre-approval application of the customer.

16. The lending system of claim 12, wherein:
the pre-approval result comprises a set of loan products for which the customer has qualified for pre-approval, each loan product associated with a respective pre-approval amount; and
the processing circuitry is further configured to compare the respective pre-approval amounts of the set of loan products and select a highest pre-approval amount as the maximum pre-approval amount.

17. The lending system of claim 12, the processing circuitry further configured to:
receive a referral from an agent, the referral referring the customer to the lending system, the referral received via the communication interface;
create an account for the customer in response to receiving the referral;
communicate an invitation to the customer via the communication interface, the invitation comprising a web address or link that enables the customer to complete registration of the account.

18. The lending system of claim 12, the processing circuitry further configured to:
receive an indication that the customer has opted to proceed with a loan process; and
facilitate connecting the customer with the lender or another lender.

19. The user device of claim 1, wherein the interactive pre-approval field comprises:
an illustration of the range of permissible pre-approval amounts;
a slider configured to be dragged across the illustration to indicate a particular pre-approval amount within the range of permissible pre-approval amounts.

* * * * *